United States Patent
Ahn et al.

[11] Patent Number: 5,493,632
[45] Date of Patent: Feb. 20, 1996

[54] NEURAL NETWORK EMPLOYING A LOCATION ADDRESSABLE MEMORY AND METHOD FOR OPERATING THE SAME

[75] Inventors: Seung K. Ahn; Bo H. Wang; Seok B. Ko; Yoon K. Lee, all of Seoul, Rep. of Korea

[73] Assignee: Goldstar Co., Ltd., Seoul, Rep. of Korea

[21] Appl. No.: 112,364

[22] Filed: Aug. 27, 1993

[30] Foreign Application Priority Data

Aug. 28, 1992 [KR] Rep. of Korea ............... 15553/1992
Jan. 21, 1993 [KR] Rep. of Korea ................. 761/1993

[51] Int. Cl.$^6$ ................................................. G06F 15/18
[52] U.S. Cl. ................................................ 395/27; 395/24
[58] Field of Search .................................. 395/27, 24, 23, 395/21

[56] References Cited

U.S. PATENT DOCUMENTS

| | | | |
|---|---|---|---|
| 4,897,811 | 1/1990 | Scofield | 395/21 |
| 5,107,454 | 4/1992 | Niki | 395/24 |
| 5,222,195 | 6/1993 | Alkon et al. | 395/24 |

OTHER PUBLICATIONS

A High Storage Capacity Neural Net Content–Addressable Memory Hartman 1991 Dec. 31 Network 2.
Neural Net. Arch. for CAM Tarassenko et al. IEEE Feb. 1991 VLSI Implementation of a Neural Associative Memory and its Application to Vector Quantization Goodman et al. 1990 Jul. 09/Internat NN Conf. Jul. 9–13 1990.
Hybrid Location–Content Addressable Memory Wang et al. IEEE/28 Mar.–1 Apr. 1993.

Primary Examiner—Allen R. MacDonald
Assistant Examiner—Richemond Dorvil
Attorney, Agent, or Firm—Finnegan, Henderson, Farabow, Garrett & Dunner

[57] ABSTRACT

A neural network provides faster learning speed and simplified overall structure through use of the concept of indirect association and a method for operating the same. The neural network is constructed as a CLCAM comprising an input-side single layer perceptron adapted to realize direct associations ($X_i$, $Z_{1i}$) as linearly separable problems with respect to given inputs ($X_i$) and first intermediate states ($Z_{1i}$) derived by the user, an output-side single layer perceptron adapted to realize direct associations ($Z_{2i}$, $Y_i$) as linearly separable problems with respect to given outputs ($Y_i$) and second intermediate states ($Z_{2i}$) derived by the user, and a location addressable memory adapted to connect said first intermediate states ($Z_{1i}$) with said second intermediate states ($Z_{2i}$). The neural network is also constructed as HyLCAM comprising a single layer perceptron adapted to realize direct associations ($X_i$,$Z_i$) as linearly separable problems with respect to given inputs ($X_i$) and intermediate states ($Z_i$) manually derived by the user, and a location addressable memory adapted to receive the intermediate states ($Z_i$) from the single layer perceptron as addresses and store given output data ($Y_i$) as desired output values, correspondingly to the addresses.

24 Claims, 21 Drawing Sheets output $Y_i$ input $X_i$

FIG.3a
prior art
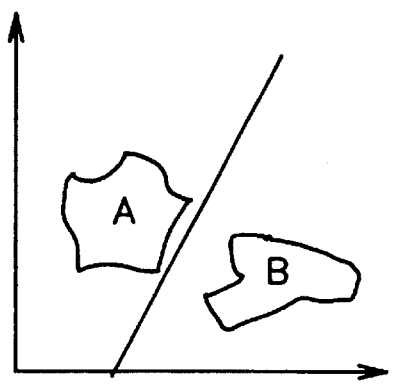
FIG.3b
prior art
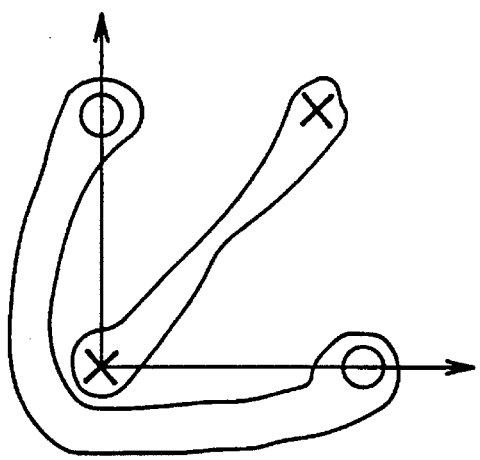
FIG.3c
prior art
| A | B | C |
|---|---|---|
| 0 | 0 | 0 (X) |
| 0 | 1 | 1 (O) |
| 1 | 0 | 1 (O) |
| 1 | 1 | 0 (X) |

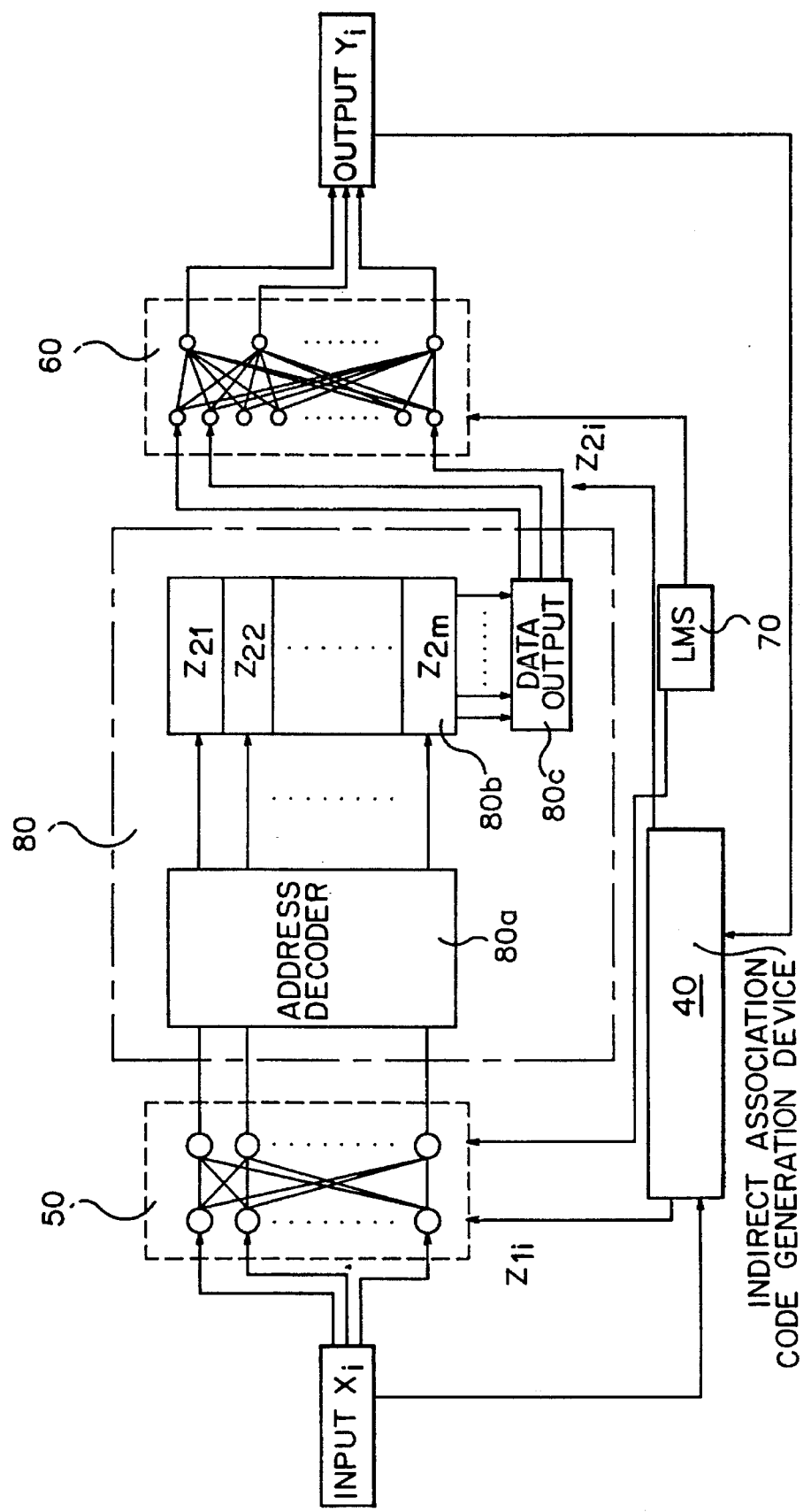

CODES WITH ONE COMPLEMENT EXCHANGED

FIG.11e

| INPUT | INDIRECT ASSOCIATION CODE |
|---|---|
| 0 0 0<br>0 0 1<br>0 1 0 | 0 0<br>0 1<br>0 0 |
| 1 0 1<br>1 1 0<br>1 1 1 | 1 1<br>1 0<br>1 1 |

NEURAL NETWORK EMPLOYING A LOCATION ADDRESSABLE MEMORY AND METHOD FOR OPERATING THE SAME

BACKGROUND OF THE INVENTION

1. Field of the Invention

The present invention relates to a neural network and a method for operating the same.

2. Description of the Prior Art

Generally, "neural network" means a network which realizes technologically the structure of a brain of an organism and its operating principle.

Such a general neural network has a structure comprising multiple layers each having a finite number of neurons, as shown in FIG. 1a. Each neuron of each layer is connected to neurons of neighboring layers. Such a connection characteristic is modeled as a value indicative of a connection strength.

The neural network serves mainly to vary such a connection strength, in order to approximate a given function to a desired or higher accuracy.

A method for determining such a connection strength to obtain a specific output for a specific input is called a learning rule.

FIG. 1b is an enlarged view of a region k in FIG. 1a, showing a condition that each neuron of each layer is connected to neurons of neighboring layers, with different connection strengths.

In FIG. 1b, $x_i(x_1, x_2, \ldots x_n)$ denotes an input value received in each neuron and $w_i(w_1, w_2, \ldots w_n)$ denotes a connection strength between each neuron and each input value $x_i$. Also, the symbol denotes the threshold. Herein, n represents a positive integer.

Consequently, the neural network provides a desired output value for a given input value, by varying a corresponding connection strength $w_i$.

In initial neural networks research, a basic model was proposed as a kind of neural network, that is called a single layer perceptron. The single layer perceptron includes one input layer and one output layer. In this case, connection strengths, namely, weights, constitute one of the input/output layers. For controlling these weights, a least mean square learning process is mainly utilized.

A procedure for operating the single layer perceptron will now be described, in conjunction with FIG. 6a.

First, consider the single layer perceptron. In this case, input data are n-dimensional vectors $X_i$ ($X_i=[x_1, x_2, \ldots x_n]$) and output data are p-dimensional vectors $Y_i$ ($Y_i=[y_1, y_2, \ldots y_n]$). The weight for connecting the i-th neuron of an output layer and the j-th neuron of an input layer can be expressed as $w_{ij}$.

Accordingly, an output obtained when an input of $X_i$ is applied to the single layer perceptron can be computed by performing the vector-matrix multiplication and addition and expressed by the following equation (1):

$$Y_i = f\left( \sum_{j=1}^{n} w_{ij} \cdot x_j \right) \quad (1)$$

wherein, f represents a nonlinear function.

For learning m number of learning data $(X_1,Y_1), (X_2,Y_2) \ldots (X_m,Y_m)$ given for input values $X_i$ and output values $Y_i$ in the single layer perceptron, it is required to control the weights according to the least mean square learning process, as expressed by the following equation (2):

$$W_{ij}(k+1) = W_{ij}(k) + [Y_i(k) - d_i(k)] x_j(k) \quad (2)$$

wherein, $d_i(k)$ represents a desired output and $Y_i(k)$ represents an actual output.

Upon receiving one input $X_i$ of the learning data, first, the single layer perceptron first detects an output error by deducting the actual output $d_i$ from the desired output $Y_i$, in accordance with the equation (2). Based on the obtained output error, the weight between the input layer and the output layer is then varied. Thereafter, a check is made to determine whether the output error has been reduced to a desired Level. Where the output error has been reduced to the desired level, the learning procedure is completed. If not, the procedure returns to the step of detecting the output error.

As mentioned above, the single layer perceptron has an advantage that the learning can be accurately achieved at a high rate, since the neurons of the input layer are directly connected with each neuron of the output layer, with independent weights. However, it involves a disadvantage that a linearly separable problem can only be solved.

A structure $(X_i, Y_i)$ for directly connecting the input $X_i$ and the output $Y_i$, such as the single layer perceptron, is called a direct association. Therefore, the neural network such as the single layer perceptron can be viewed as a content addressable memory (CAM) which serves as an associative memory.

Generally, upon receiving an input, such an associative memory or CAM derives an output associated with the received input.

In terms of a concept corresponding to a location addressable memory (LAM), the CAM has an advantage that stored information can be associated by only a partial representation thereof.

When some pattern recognition problem can be accurately separated into n−1-dimensional Hyper planes in a n-dimensional space, this problem is called a linearly separable problem.

FIG. 3a illustrates an example of such a linearly separable problem in a two-dimensional space. As shown in FIG. 3a, planes A and B in the two-dimensional space can be accurately linearly separated.

On the other hand, a pattern recognition problem which can not be viewed as the linearly separable problem is called a nonlinearly separable problem.

Referring to FIG. 3b, there is illustrated an example of such a nonlinearly separable problem in a two-dimensional space. As shown in FIG. 3b, planes X and O in the two-dimensional space can not be linearly separated. Accordingly, the nonlinearly separable problem can be viewed as one corresponding to XOR, namely, an exclusive OR logic, as depicted in a truth table.

However, a small minority of pattern recognition problems belong to the linearly separable problem, while the majority belong to the nonlinearly separable problem.

Accordingly, the single layer perceptron embodying the concept of direct association can not solve the nonlinearly separable problem as shown in FIG. 3b, due to a limited representation capability of the network itself, as proved by Minskey and Papert (M. L. Minskey and S. A. Papert, Perceptron: "An Introduction to Computational Geometry", Cambridge, MA:MIT Press, expanded edition, 1988). As another kind of neural network, a multilayer perceptron has been proposed, which is a cascade of single layer perceptrons.

A multilayer perceptron is adapted to eliminate the disadvantage of the single layer perceptron, i.e., its limited capability of only solving the linearly separable problem. As shown in FIG. 2b, the multilayer perceptron is a neural network comprising at least three layers including one input layer, one output layer and a hidden layer interposed between the input layer and the output layer. The multilayer perceptron realizes the concept of indirect association by associating input states $X_i$ and output states $Y_i$ through intermediate states $Z_i$ of a hidden layer. As shown in FIG. 4, the direct association $(X_i, Y_i)$ is considered as the logical implicative rule: IF $X_i$, THEN $Y_i$, namely, the IF-THEN RULE, whereas the indirect association is considered as the logical syllogism: IF $X_i$, THEN $Z_i$ and THEN $Y_i$.

Consequently, the indirect association is to produce 3-tuples $(Z_i, X_i, Y_i)$ by adding intermediate states $Z_i$ between inputs $X_i$ and outputs $Y_i$, in order to make the direct associations easier. In terms of logic, the indirect association can be interpreted as two direct associations.

In other words, the indirect association is the logical syllogism expressed by the rule: if $X_i$, then $Z_i$ and if $Z_i$, then $Y_i$ and can be separated into two direct associations expressed by two rules, that is, the rule: if $X_i$, then $Z_i$ and the rule: if $Z_i$, then $Y_i$. By virtue of such a separation, the multilayer perceptron with one hidden layer can be considered as a cascade of single layer perceptrons.

An error back propagation learning method has been commonly used as a learning method of the multilayer perceptron.

In accordance with the error back propagation learning method, it is possible to approximate any function to a desired or higher accuracy, provided that a sufficient number of neurons are secured. This is proved by Hornik and et al. (K. Hornik, N. Stinchcombe, and H. White, "Multilayer feed forward networks are universal approximators", Neural Networks, Vol. 2, no. 5, pp. 359–366, 1989).

In the sense of the indirect association shown in FIG. 4, the back propagation learning method can be interpreted as the method of automatically discovering the intermediate states $Z_i$ linearly separable with respect to the given input data $X_i$ and output data $Y_i$.

The principle of the error back propagation learning is as follows: upon receiving one input of learning data, first, a weight (namely, a second weight) between the hidden layer and the output layer is varied, using the error between the desired output and the actual output. That is, a variation in a second connection strength is achieved. Depending on the second weight, a weight (namely, a first weight) between the input layer and the hidden layer is varied.

Operation of the multilayer perceptron will now be described, in conjunction with FIG. 6b illustrating an error back propagation learning procedure which is a gradient descent process carried out by the multilayer perceptron and FIG. 6c illustrating the order of error back propagation learning.

Consider the multilayer perceptron shown in FIG. 2b. The multilayer perceptron structure including hidden layers added to single layer perceptrons provides a possibility that the neural network may solve the nonlinearly separable problem. However, the least mean square learning process utilized for learning the single layer perceptron can not be used for the multilayer perceptron, due to the addition of hidden layers. As a result, a new learning rule is required.

The error back propagation learning rule satisfies this requirement and can be expressed by the following equation (3):

$$w_{ij}(k+1) = w_{ij}(k) + \delta_{ij} O_{pj} \quad (3)$$

wherein, $w_{ij}$ represents the connection strength, namely, the weight between the i-th neuron and the j-th neuron and represents a learning constant.

In the equation (3), $\delta_{ij}$ is an error obtained in the j-th neuron upon receiving the p-th input. The error can be expressed by the following equation (4) for the output layer 4 and the following equation (5) for the hidden layer:

$$\delta_{pj} = K O_{pj}(1 - O_{pj})(d_{pj} - O_{pj}) \quad (4)$$

$$\delta_{pj} = K O_{pj}(1 - O_{pj}) \sum_k (\delta_{pj} w_{jk}) \quad (5)$$

In the equations (4) and (5), $O_{pj}$ represents an actual output value of the j-th neuron and $d_{pj}$ represents a desired output value of the j-th neuron. Also, K represents the number of learning times and i, j, p and k represent positive integers.

FIG. 7a is an energy graph for a case of controlling the weights in accordance with the least mean square learning process. When the weights are converged to minima M, the learning is completed.

FIG. 7b is an energy graph for a case of controlling the weights in accordance with the error back propagation learning method. When the weights are converged to global minima GM, the learning is completed.

Upon receiving one input of learning data, the multilayer perceptron deducts the actual output from the desired output, in accordance with the equations (3), (4) and (5), so as to detect an output error.

Using the detected output error, the second weight between the hidden layer and the output layer is varied. Then, the first weight between the input layer and the hidden layer is varied, in proportion to the varied second weight. A check is then made to determine whether the output error has been reduced to a desired level. When the output error has been reduced to the desired level, the learning procedure is completed. If not, the procedure returns to the procedure of detecting the output error.

The multilayer perceptron utilizing the error back propagation learning method has an advantage of solving the nonlinearly separable problem, as mentioned above. However, it encounters the following problems, as proved by Hornik.

First, the weights are likely to be converged to local error minima LM, as shown in FIG. 7b.

Second, the learning time is very slow, because only the error of the output layer is used for automatically discovering the intermediate states $Z_i$ for obtaining m number of most proper indirect associations $U(X_i, Z_i, Y_i)$ for m number of given associations $U(X_i, Y_i)$ in accordance with the gradient descent process and adjust the weights of each layer.

Third, the learning performance is highly sensitive to the initial weights, as shown in FIG. 7b. In other words, the learning performance is varied, depending on selected initial weights. As a result, the learning performance becomes inconstant. For example, where the initial weights W(0) are positioned at the points A, B, C and D, the learning performances therefor have the following order:

$$A > B > C > D \quad (6)$$

Fourth, the learning efficiency is varied, depending on the order of presentation of learning data.

In accordance with the above-mentioned concept of indirect association, these problems mean that the neural network, namely, the multilayer perceptron can not determine proper intermediate states $Z_i$.

SUMMARY OF THE INVENTION

Therefore, an object of the invention is to eliminate the above-mentioned disadvantages encountered in the single layer perceptron and the multilayer perceptron and thus to provide a neural network structured as a content-location-content addressable memory capable of improving the learning speed and simplifying the overall structure by virtue of an introduction of the concept of indirect association and a method for operating the same.

Another object of the invention is to provide a neural network structured as a hybrid location-content addressable memory capable of improving the learning speed and simplifying the overall structure by virtue of an introduction of the concept of indirect association and a method for operating the same.

In accordance with one aspect of the present invention for accomplishing these objects, indirect association code generation means is provided, which is adapted to obtain first intermediate states ($Z_{1i}$) and second intermediate states ($Z_{2i}$) linearly separable with respect to given input data ($X_i$) and output data ($Y_i$), so as to obtain two kinds of direct associations ($X_i, Z_{1i}$) and ($Z_{2i}, Y_i$) according to the concept of indirect association. An input-side single layer perceptron realizes the direct associations ($X_i, Z_{1i}$) as linearly separable problems with respect to the given inputs ($X_i$) and the first intermediate states ($Z_{1i}$) and outputs the first intermediate states ($Z_{1i}$) as addresses of a location addressable memory. An output-side single layer perceptron realizes the direct associations ($Z_{2i}, Y_i$) as linearly separable problems with respect to the given outputs ($Y_i$) and the second intermediate states ($Z_{2i}$) and outputs the given output data ($Y_i$) as output data. Also, learning means is provided, which is adapted to train the direct associations ($X_i, Z_{1i}$) and ($Z_{2i}, Y_i$) by the least mean square learning process. The location addressable memory stores the first intermediate states ($Z_{1i}$) of the input-side single layer perceptron as addresses and stores the second intermediate states ($Z_{2i}$) of the output-side single layer perceptron as contents corresponding to the addresses. That is, the location addressable memory connects the first intermediate states ($Z_{1i}$) and the second intermediate states ($Z_{2i}$) in series.

In accordance with another aspect of the present invention, the indirect association code generation means is adapted to derive intermediate states ($Z_i$) linearly separable with respect to given input data ($X_i$) by using the given input data ($X_i$) and given output data ($Y_i$) according to the concept of indirect association, so as to obtain two kinds of direct associations ($X_i, Z_{1i}$) and ($Z_i, Y_i$) from single direct associations ($X_i, Y_i$). A single layer perceptron realizes direct associations ($X_i, Z_i$) as linearly separable problems with respect to given inputs ($X_i$) and intermediate states ($Z_i$) and outputs the intermediate states ($Z_i$) as addresses of the location addressable memory. The learning means trains the direct associations ($X_i, Z_i$) in the single layer perceptron by the least mean square learning process. The location addressable memory receives the intermediate states ($Z_i$) from the single layer perceptron as addresses and stores given output data ($Y_i$) as desired output data, correspondingly to the addresses.

In accordance with these aspects, it is possible to provide neural networks with a simple structure and a fast learning speed.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate a preferred embodiment of the invention and together with the description provide an explanation of the objects, advantages and principles of the invention. In the drawings:

FIG. 1b is an enlarged view of a portion k of FIG. 1a;

FIG. 3a is a schematic view explaining a linearly separable problem;

FIG. 3b is a schematic view explaining a nonlinearly separable problem;

FIG. 3c is a truth table of exclusive OR logic illustrating a nonlinearly-separable problem.

FIG. 9 is a detailed block diagram of the CLCAM according to the first embodiment;

FIG. 11e is a table related to FIGS. 11b through 11d;

DETAILED DESCRIPTION OF THE PREFERRED EMBODIMENTS

The present invention will now be described in detail, with reference to first and second embodiments shown in FIGS. 8 to 16.

First Embodiment

Before describing a neural network and an operating method therefor according to the first embodiment of the present invention, the prior art relating thereto will be briefly described again, to facilitate an understanding of the present invention.

"Neural network" is a content addressable memory serving as an associative memory. Upon receiving an input, such an associative memory derives an output associated with the given input.

The single layer perceptron realizes the concept of direct association, whereas the multilayer perceptron realizes the concept of indirect association.

In the sense of logic, the indirect association can be interpreted as two direct associations. In other words, the indirect association is the logical syllogism expressed by the following equation (7). This logical syllogism can be separated into two direct associations which have rules expressed by the following equations (8) and (9), respectively.

If X, then Z and if Z, then Y  (7)

If X, then Z  (8)

If Z, then Y  (9)

By virtue of such a separation, the multilayer perceptron with one hidden layer can be considered as a cascade of two single layer perceptrons.

The error back propagation learning described hereinbefore in conjunction with the prior art is carried out for automatically discovering intermediate states Z for obtaining m number of most proper indirect associations for m number of given associations $U(X_i,Y_i)$, in accordance with the gradient descent process.

However, the back propagation suffers from the above-mentioned four serious problems. In order to solve these problems, the neural network according to the first embodiment is constructed such that the user discovers directly two intermediate states $Z_{1i}$ and $Z_{2i}$ which make two direct associations $U(X_i, Z_i)$ and $U(Z_i,Y_i)$ separated from the indirect association $U(X_i,Z_i,Y_i)$ into the linearly separable problems.

The separated direct associations $U(X_i, Z_i)$ and $U(Z_i,Y_i)$ are trained according to the least mean square learning process, while the intermediate states $Z_{1i}$ and $Z_{2i}$ are connected by a location addressable memory.

As mentioned above, the new neural network in accordance with the first embodiment comprises two direct associations. In particular, a new network structure shown in FIGS. 8 and 9 is employed, since two intermediate states are connected to the direct associations.

Figure 1A:
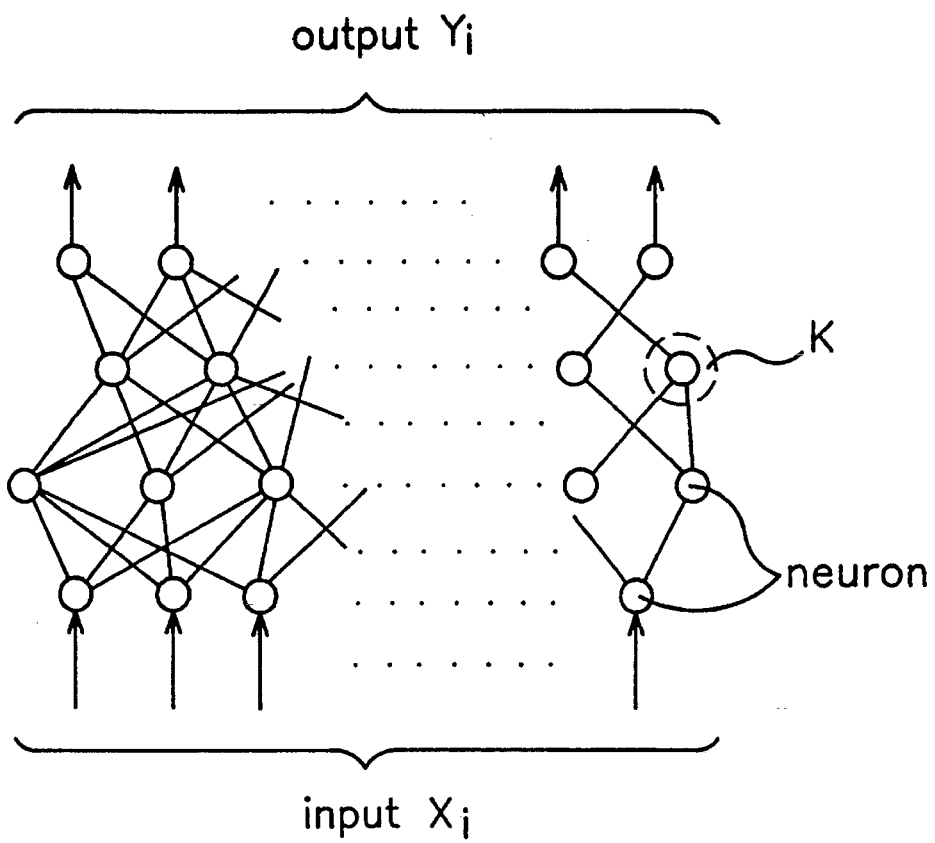
FIG. 1a is a diagram of the structure of a general neural network.
Figure 1B:
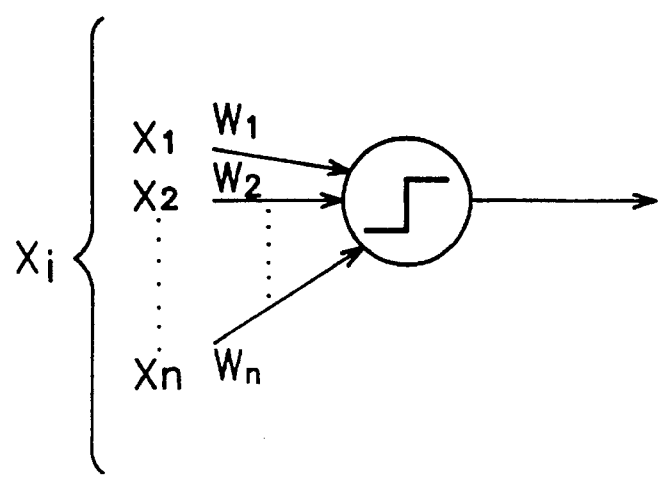
Figure 2A:
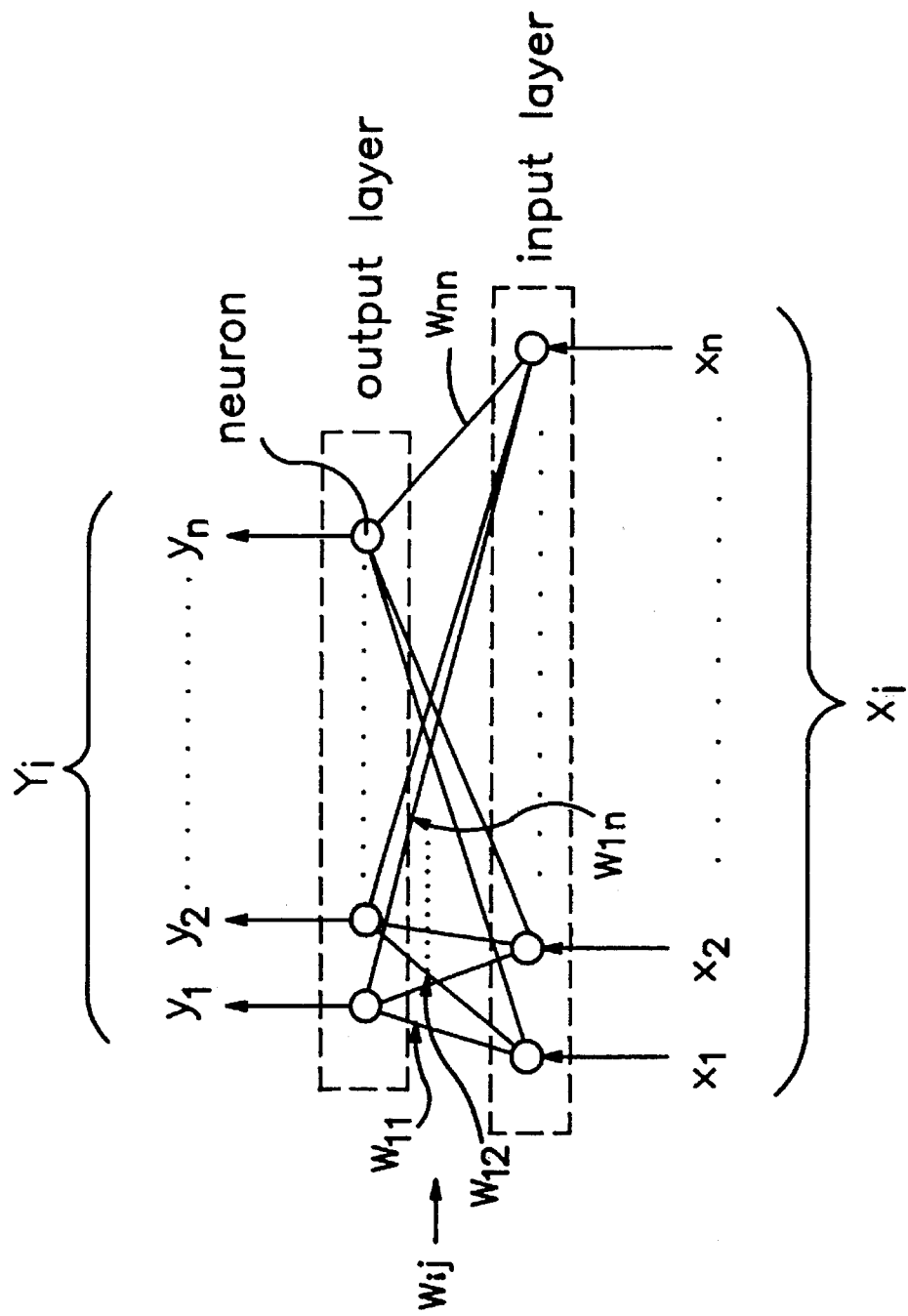
FIG. 2a is a diagram of the structure of a single layer perceptron.
Figure 2B:
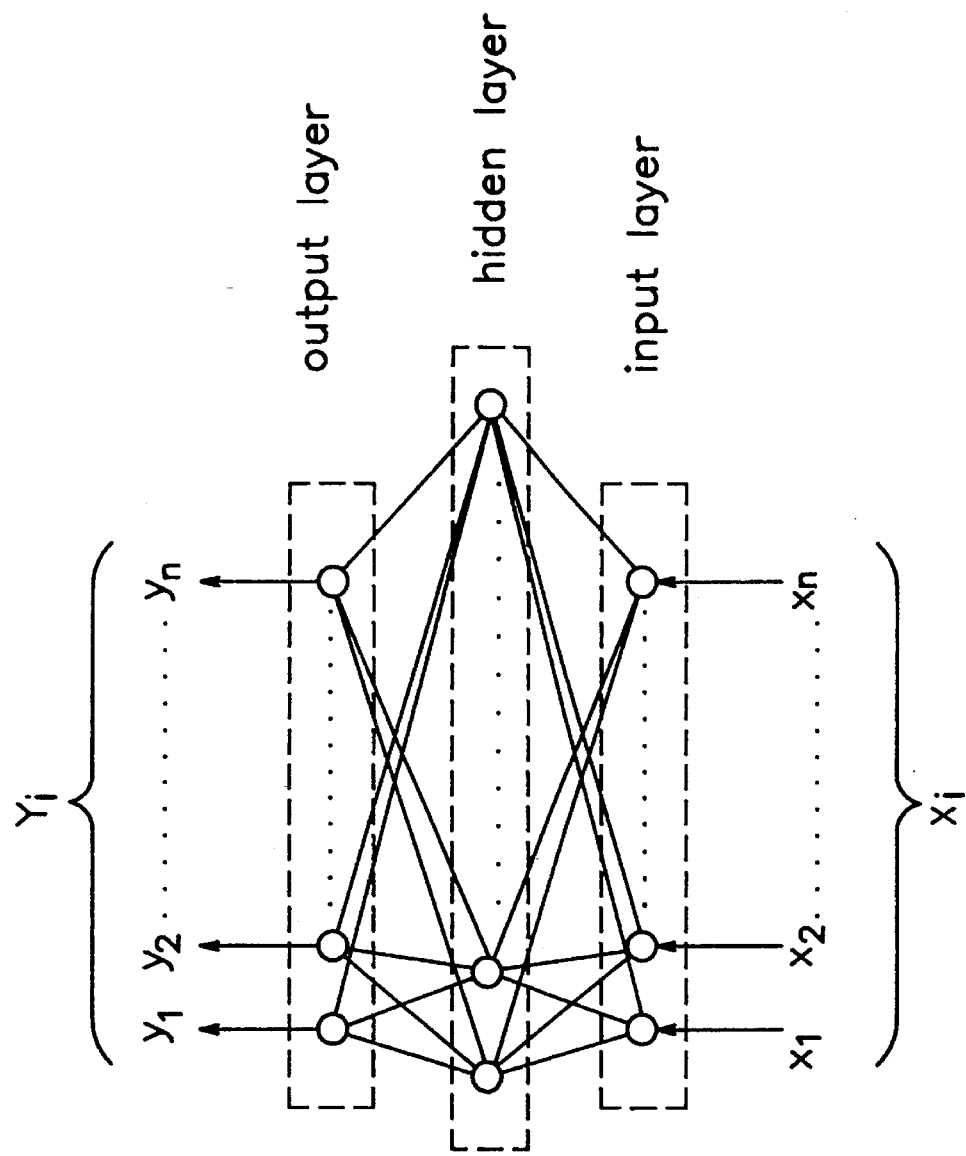
FIG. 2b is a diagram of the structure of a multilayer perceptron.
Figure 4:
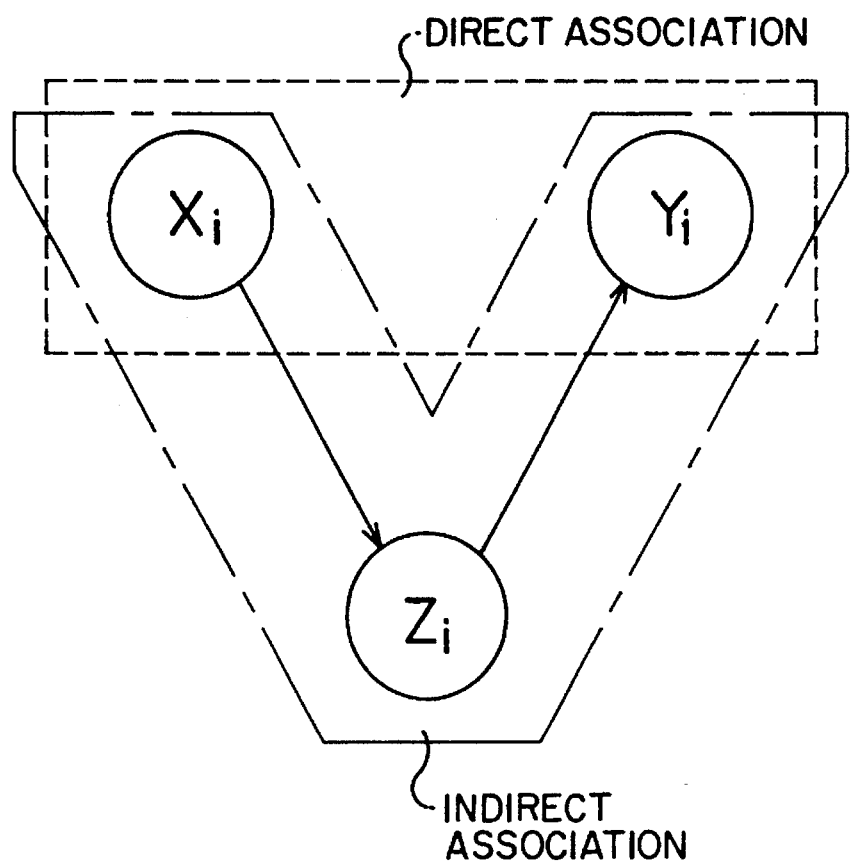
FIG. 4 is a diagram explaining the concept of indirect association.
Figure 5:
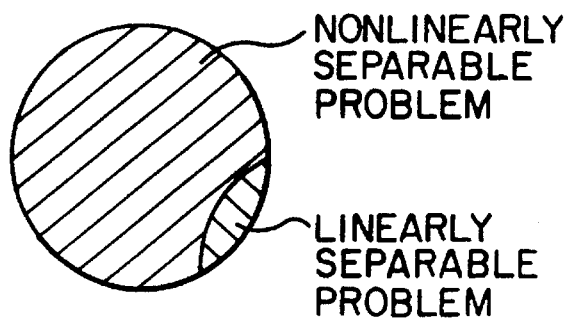
FIG. 5 is a diagram illustrating the relationship between the linearly separable problem and the nonlinearly separable problem of the entire pattern recognition problem.
Figure 6A:
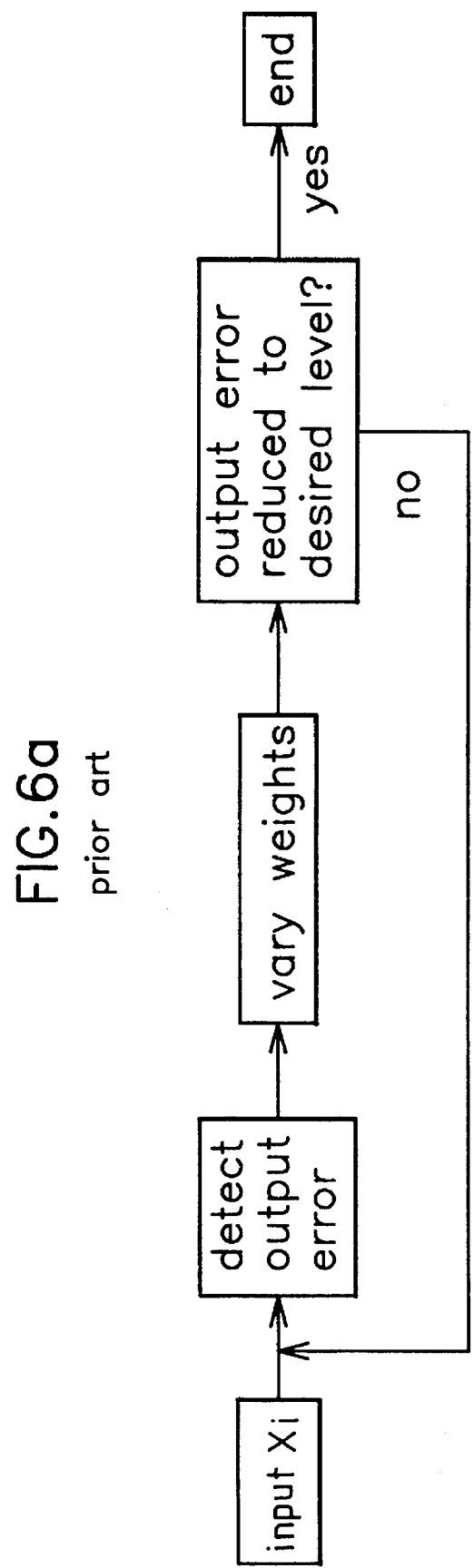
FIG. 6a is a diagram explaining a learning procedure of the single layer perceptron.
Figure 6B:
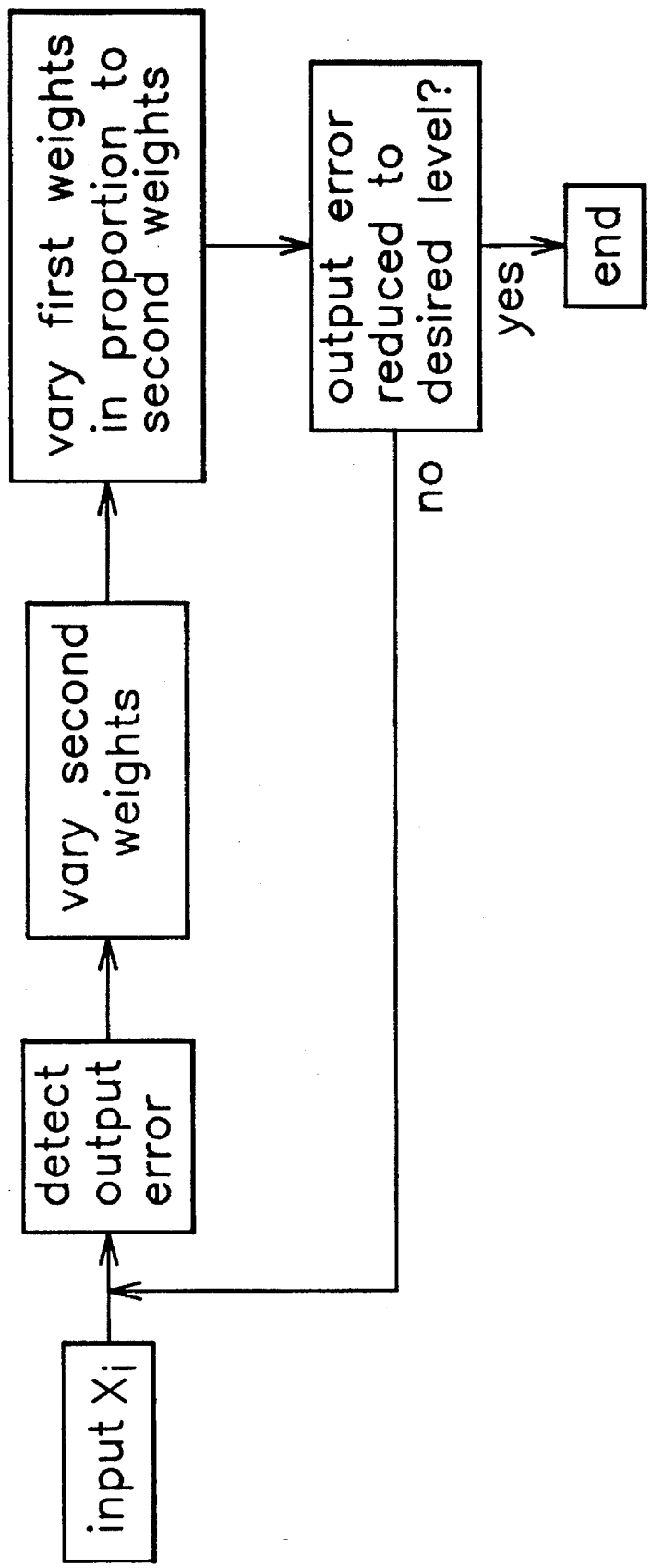
FIG. 6b is a diagram explaining a learning procedure of the multilayer perceptron.
Figure 6C:
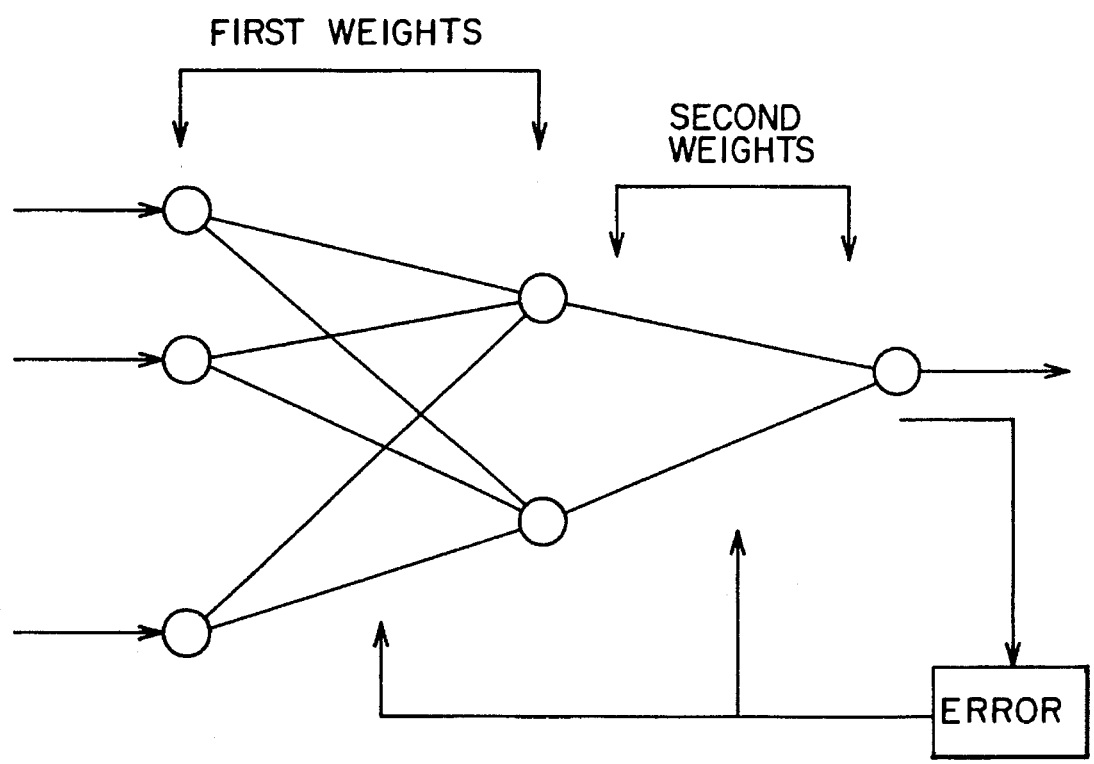
FIG. 6c is a diagram explaining a gradient descent process of the multilayer perceptron.
Figure 7A:
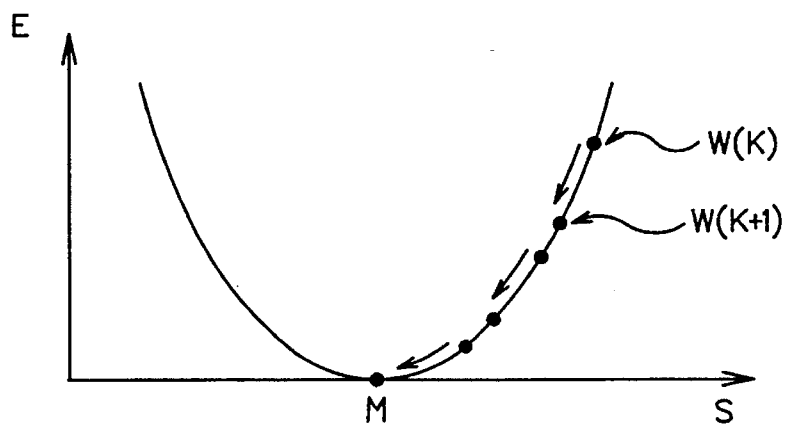
FIG. 7a is an energy graph illustrating a case of controlling weights in the multilayer perceptron in accordance with the least mean square learning process.
Figure 7B:
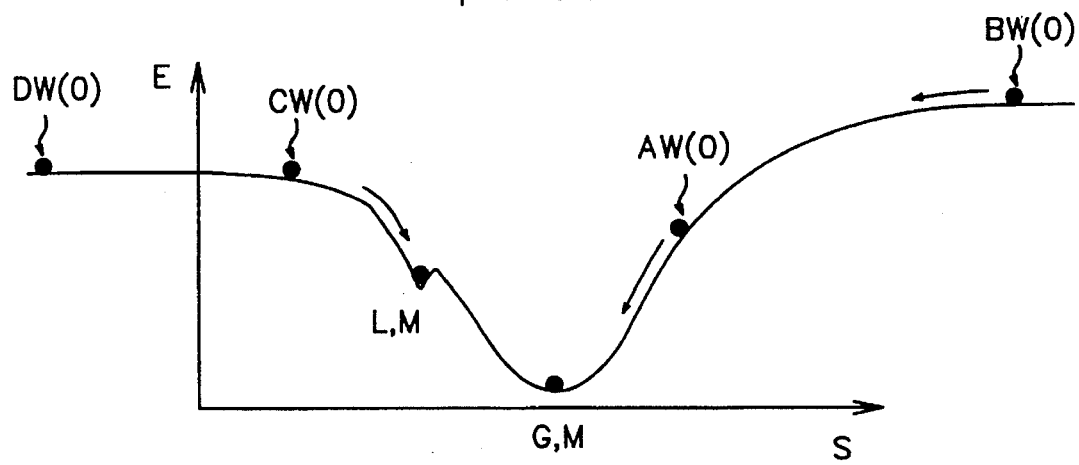
FIG. 7b is an energy graph illustrating a case of controlling weights in the multilayer perceptron in accordance with the error back propagation learning process.
Figure 8:
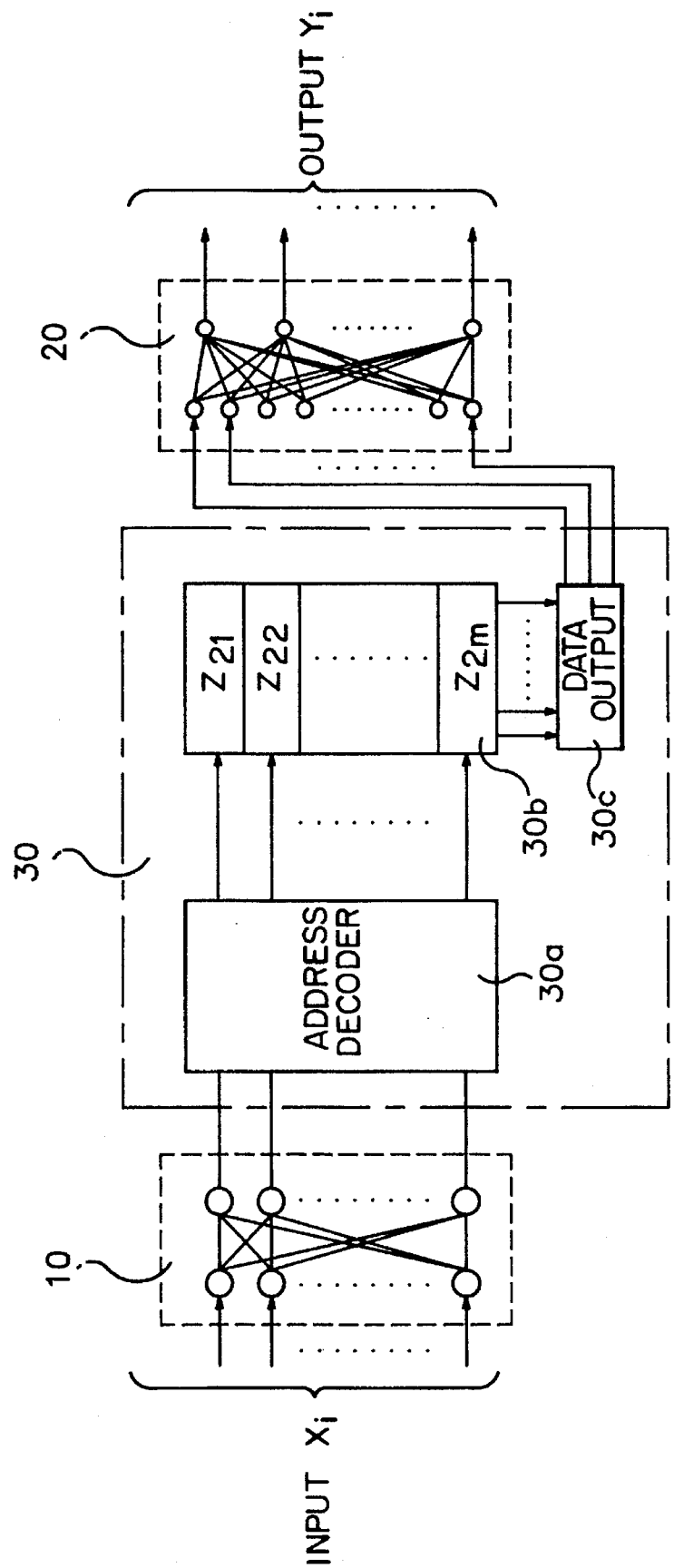
FIG. 8 is a conceptual block diagram of a CLCAM according to a first embodiment of the present invention.

FIG. 8 is a conceptual block diagram of the new neural network according to the first embodiment of the present invention. As shown in FIG. 8, the neural network comprises an input-side single layer perceptron 10 adapted to realize direct associations $(X_i, Z_{1i})$ as linearly separable problems with respect to given inputs $X_i$ and first intermediate states $Z_{1i}$ derived by the user, an output-side single layer perceptron 20 adapted to realize direct associations $(Z_{2i},Y_i)$ as linearly separable problems with respect to given outputs $Y_i$ and second intermediate states $Z_{2i}$ derived by the user, and a location addressable memory 30 adapted to connect the first intermediate states $Z_{1i}$ with the second intermediate states $Z_{2i}$.

The location addressable memory 30 is of the general memory type and comprises an address decoding part 30a, a content part 30b for storing a content corresponding to each address, and a data output part 30c.

The first single layer perceptron 10 and the second single layer perceptron 20 in the construction of FIG. 8 can be considered as a content addressable memory, as mentioned above.

The neural network of the first embodiment can be called a content-location-content addressable memory (CLCAM), in that it is constituted by two content addressable memories and one location addressable memory positioned between the content addressable memories, as shown in FIG. 8.

In order to learn m number of externally given direct associations $(X_i,Y_i)$ in the CLCAM of FIG. 8, it is necessary to use a method for finding simply and systematically the first intermediate states $Z_{1i}$ and the second intermediate states $Z_{2i}$ which make direct associations $U(X_i, Z_{1i})$ and $U(Z_{2i},Y_i)$ separated from the direct association $(X_i,Y_i)$ given according to the concept of indirect association, into the linearly separable problems.

The linearly separable problems are called indirect association code generation problems. As one of various methods for solving these problems, the first embodiment of the present invention employs a method based on the geometrical arrangements of complement data.

After the first intermediate states $Z_{1i}$ and the second intermediate states $Z_{2i}$ are derived as a solution to the indirect association problems for m number of given associations $U(X_i,Y_i)$, both the input-side content addressable memory (for example, the single layer perceptron) and the output-side content addressable memory (for example, the single layer perceptron) are finally trained by the least mean square learning process.

Accordingly, the CLCAM of FIG. 8 can be more concretely constructed, as shown in FIG. 9.

That is, the CLCAM shown in FIG. 9 comprises an indirect association code generation device 40 adapted to obtain first intermediate states $Z_{1i}$ and second intermediate states $Z_{2i}$ linearly separable from given input data $X_i$ and output information $Y_i$, an input-side single layer perceptron 50 adapted to realize direct associations $(X_i, Z_{1i})$ as linearly separable problems with respect to the given inputs $X_i$ and the first intermediate states $Z_{1i}$, an output-side single layer perceptron 60 adapted to realize direct associations $(Z_{2i},Y_i)$ as linearly separable problems with respect to the given outputs $Y_i$ and the second intermediate states $Z_{2i}$, a learning device 70 adapted to learn the direct associations $(X_i, Z_{1i})$ $(Z_{2i},Y_i)$ by the least mean square learning process, and a location addressable memory 80 adapted to connect the first intermediate states $Z_{1i}$ with respect to the input-side single layer perceptron 50 with the second intermediate states $Z_{2i}$ with respect to the output-side single layer perceptron 60.

Identically to the case of FIG. 8, the input-side single layer perceptron 50 and the output-side single layer perceptron 60 may be comprised of content addressable memories, respectively. Also, the location addressable memory 80 is of the general memory type and comprises an address decoding part 80a, a content part 80b, and a data output part 80c.

An operating procedure carried out by the CLCAM of FIG. 9 will now be described.

Figure 10A:
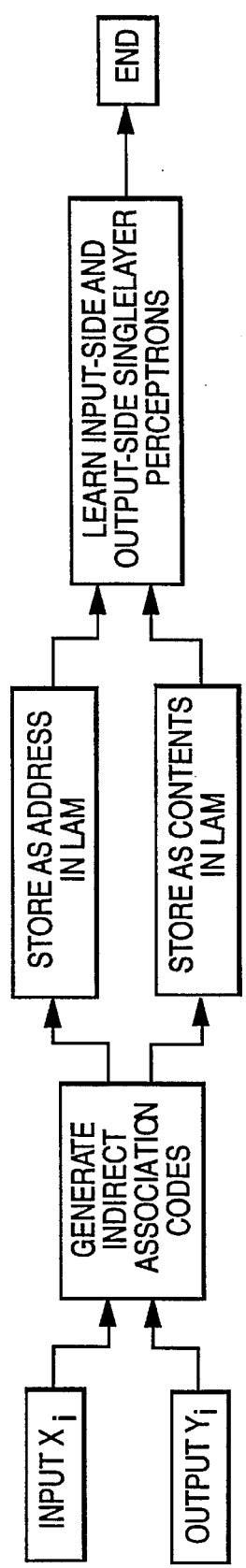
FIG. 10a is a diagram explaining a learning procedure of the CLCAM according to the first embodiment.
Figure 10B:
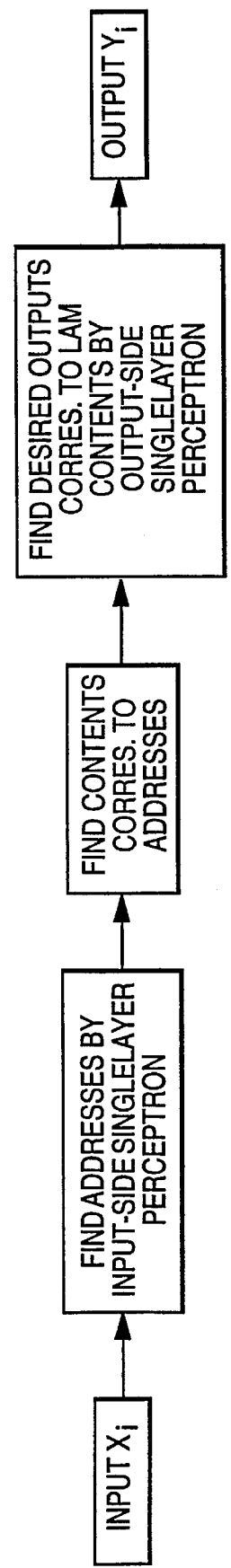
FIG. 10b is a diagram explaining an association procedure of the CLCAM according to the first embodiment.

The operating procedure of the CLCAM includes mainly a learning procedure shown in FIG. 10a and an association procedure shown in FIG. 10b.

As shown in FIG. 10a, the operating procedure comprises a first learning procedure of deriving the first intermediate states $Z_{1i}$ for obtaining linearly separable problems with respect to the given input data $X_i$ through the indirect association code generation device 40, a second learning procedure of deriving the second intermediate states $Z_{2i}$ for obtaining linearly separable problems with respect to the given output data $Y_i$ through the indirect association code generation device 40, and a third learning procedure of training two kinds of direct associations obtained through the first and second learning procedures, that is, the direct associations $(X_i, Z_{1i})$ for the input data $X_i$ and the first intermediate states $Z_{1i}$ and the direct associations $(Z_{2i}, Y_i)$ for the second intermediate states $Z_{2i}$ and the output data $Y_i$ by the least mean square learning process in the input-side single layer perceptron 50 and the output-side single layer perceptron 60, respectively.

First Learning Procedure

Figure 11A:
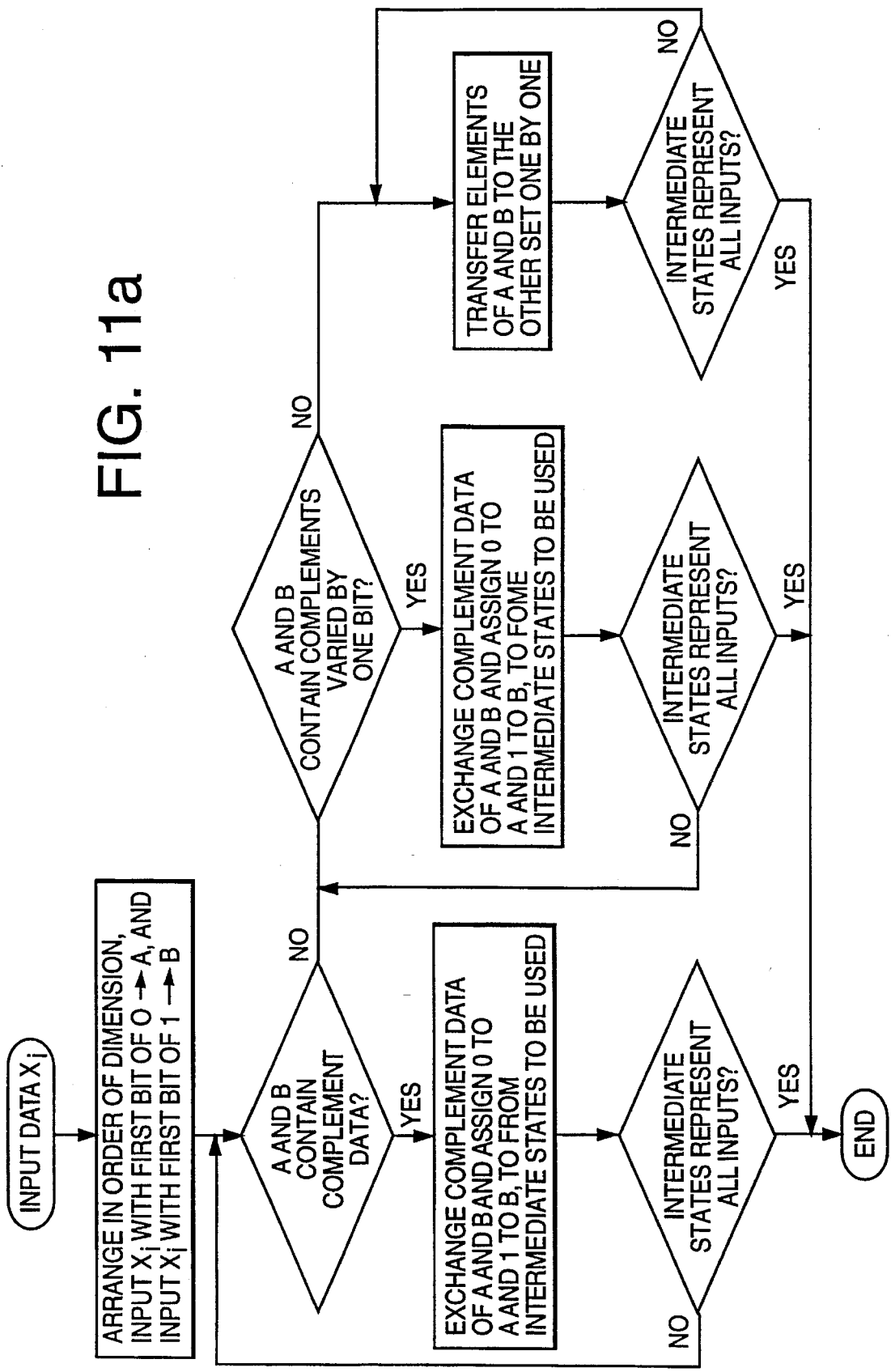
FIG. 11a is a flow chart illustrating a procedure of generating indirect association codes as first intermediate states $Z_{1i}$ linearly separable with respect to given input data $X_i$, in accordance with the first embodiment.
Figure 11B:
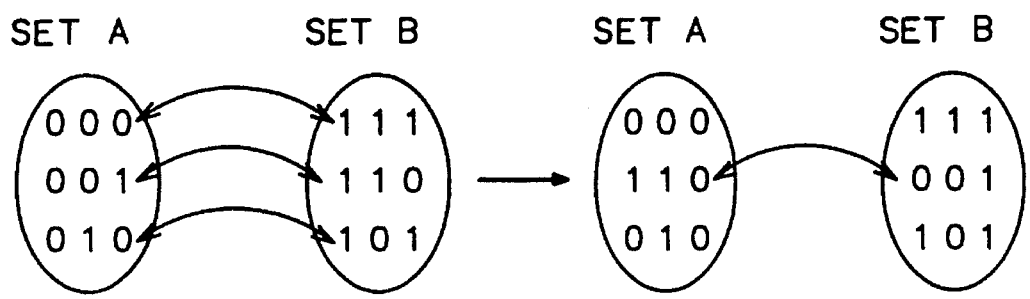
FIGS. 11b through 11d are diagrams illustrating steps of generating indirect association codes corresponding to the first intermediate states $Z_{1i}$ by using a method based on the geometrical arrangements of complement data.
Figure 11C:
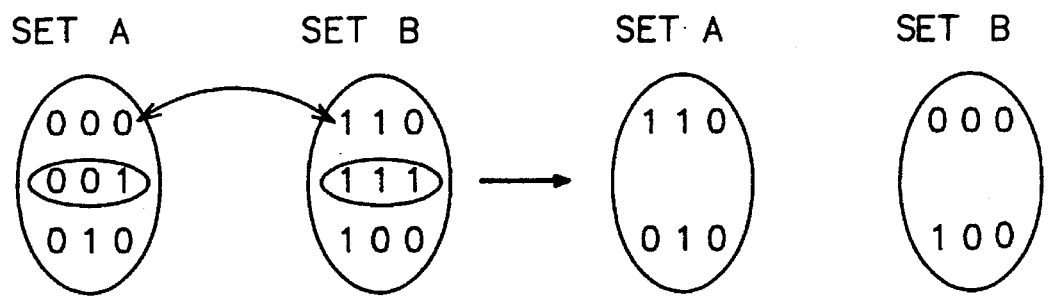
Figure 11D:
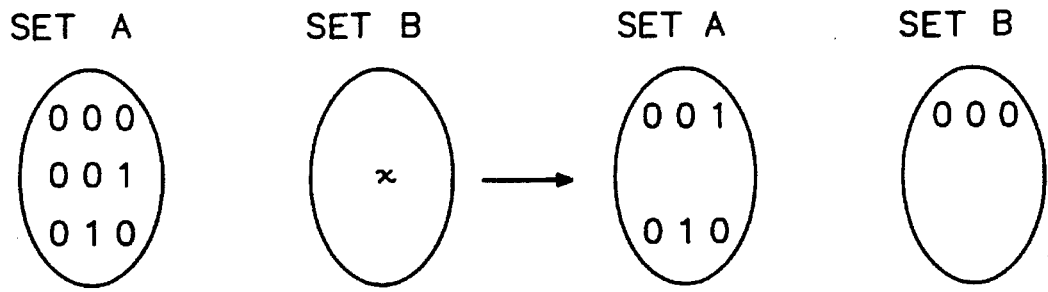

As shown in FIG. 11a, codes linearly separable with respect to the given input data $X_i$, namely, the first intermediate states $Z_{1i}$ are generated through the following steps, using a method based on the geometrical arrangements of complement data.

i) Arrange the given binary input data $X_i$ in order of dimension.

ii) Divide the given binary input data $X_i$ into two groups which have leftmost bits of 0 and 1, respectively. One set, denoted by A, consists of the input data $X_i$ whose first bits are 0. The other set, denoted by B, consists of the input data $X_i$ whose first bits are 1. Where all the input data $X_i$ have first bits of 0, the set B is an empty set. On the contrary, where all the input data $X_i$ have first bits of 1, the set A is an empty set.

iii) Find all elements of the set A whose complements are elements of the set B.

iv) Suppose that the elements found at the step (iii) are denoted by $X_1$. In this case, $X_1$ A, and $X_1^c$ B. Transfer $X_1$ and $X_1^c$ which is the complement of $X_1$ to the sets B and A, respectively. Then, assign 0 to all elements of the set A and 1 to all elements of the set B. This procedure is called coding. A binary vector obtained by the i-th coding is denoted by $g_i$.

v) Complete the coding, if all vectors of the input data $X_i$ can be distinguished from one another as they are denoted by $g_i(g_i=\{g_1, g_2, \ldots g_s\})$. If not, the coding is repeated, until all vectors can be distinguished from one another.

vi) If there is no complement $X_1^c$ to be exchanged, then find all elements of the set B which are complements of virtual elements obtained by varying elements of the set A by one bit, as shown in FIG. 11c. Where these elements are present, the coding therefor is carried out while exchanging the elements one by one, until all vectors of the input data can be distinguished from one another.

vii) If it is impossible to distinguish all vectors of the given input data $X_i$, in spite of the coding at the step (vi), then repeat the coding while transferring elements of the set A and elements of the set B to the other set one by one, until all vectors of the input data can be distinguished from one another.

viii) Store all input data vectors $g_i(g_i=\{g_1, g_2, \ldots g_s\})$ distinguishable from another, that is, the obtained first intermediate states $Z_{1i}$ as addresses of the location addressable memory 80 of FIG. 9.

Second Learning Procedure

Codes linearly separable with respect to the given output data $Y_i$, namely, the second intermediate states $Z_{2i}$ are generated through the indirect association code generation device 40.

Figure 12:
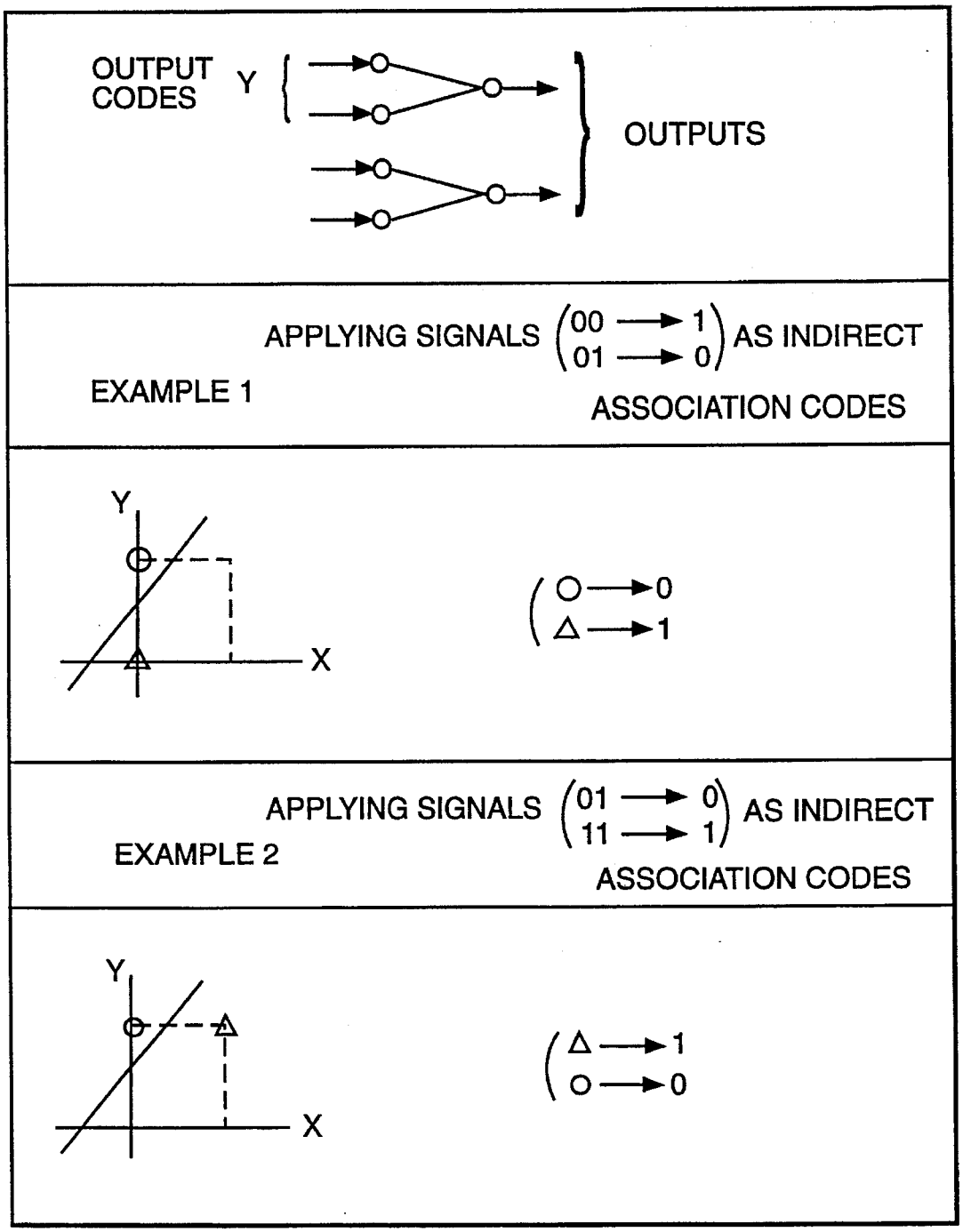
FIG. 12 is a diagram illustrating a method for generating indirect association codes as second intermediate states $Z_{2i}$ linearly separable with respect to given output data $Y_i$, in accordance with the first embodiment.

As shown in FIG. 12, the code generation is achieved by generating indirect codes which are linearly separable problems with respect to the given output data $Y_i$ and storing the indirect codes as the contents of the location addressable memory 80. The indirect codes are generated by assigning "00" to the output data $Y_i$ of 1 and "11" to the output data $Y_i$ of 0.

Although "01" or "10" is assigned, in place of "11", there is no problem.

Third Learning Procedure

Direct associations $(X_i, Z_{1i})$ and $(Z_{2i}, Y_i)$ which are the linearly separable problems realized for the first intermediate states $Z_{1i}$ and the second intermediate states $Z_{2i}$ derived by the first and second learning procedures, the given input data $X_i$ and the given output data $Y_i$ are learned in the input-side content addressable memory, namely, the single layer perceptron 50 and the output-side content addressable memory, namely, the single layer perceptron 60, respectively, by using the learning device 70 and the least mean square learning process.

Association Procedure

The association procedure comprises a first association procedure and a second association procedure.

i) Upon receiving the input data $X_i$, the input-side single layer perceptron 50 of the CLCAM of FIG. 9 trained by the above-mentioned learning procedure outputs the linearly separable first intermediate states $Z_{1i}$ to be used as addresses of the location addressable memory 80.

ii) The location addressable memory 80 outputs the linearly separable second intermediate states $Z_{2i}$ as the contents stored during the learning procedure and corresponding to addresses received therein. The second intermediate states $Z_{2i}$ are then sent to the output-side single layer perceptron 60. Outputs from the output-side single layer perceptron 60 are desired outputs.

As is apparent from the above description, the first embodiment of the present invention proposes a new neural network and an operating method therefor, by utilizing the concept of indirect association. However, the present invention is not limited to a scope defined by the above description. In accordance with the present invention, it is possible to increase the number of content addressable memories used in the CLCAM of FIG. 9, that is, the number of single layer perceptrons by modifying the indirect association code generation method in order to realize the indirect association.

For example, a neural network for solving a particular kind of pattern recognition problem may be constructed by connecting several CLCAMs of FIG. 9, in series. Alternatively, another network for solving another particular kind of pattern recognition problem may be constructed by connecting several CLCAMs of FIG. 9, in parallel.

Also, where the given input data $X_i$ and output data $Y_i$ are real-valued vectors, another network may be constructed, which includes a Q-level quantizer or an analog/digital converter, together with the CLCAM.

The CLCAM of the first embodiment provides the following effects, as compared with the multilayer perceptron utilizing the conventional error back propagation learning process.

First, the learning time is fast.

Second, the learning for all the given data is possible, by virtue of no convergence to local error minima.

Third, a superior learning performance is ensured, irrespective of the selected initial weights.

Fourth, the learning performance is ensured, irrespective of the order of applying learning data.

Fifth, a large quantity of information can be stored and learned, as compared with other neural networks with the same complexity.

Sixth, a high recognition rate is ensured in pattern recognition systems with a large storage capacity such as image recognition systems, character recognition systems, document recognition systems, video recognition systems, neural networks, prediction systems and corollary systems.

Seventh, a high recognition rate is ensured, even at a large amount of noise.

Eighth, a high control performance for neural networks is ensured.

Accordingly, the above-mentioned CLCAM is superior, as compared with the multilayer perceptrons. However, the output-side single layer perceptron is not an essential element of the CLCAM, in that it does not affect specifically the generalization capability of the CLCAM, under the assumption that there is no system fault in the location addressable memory.

Second Embodiment

The second embodiment of the present invention is adapted to provide an improved neural network and an operating method therefor, capable of simplifying the construction of CLCAM and improving the learning speed while maintaining the same performance as the CLCAM of the first embodiment.

Figure 13:
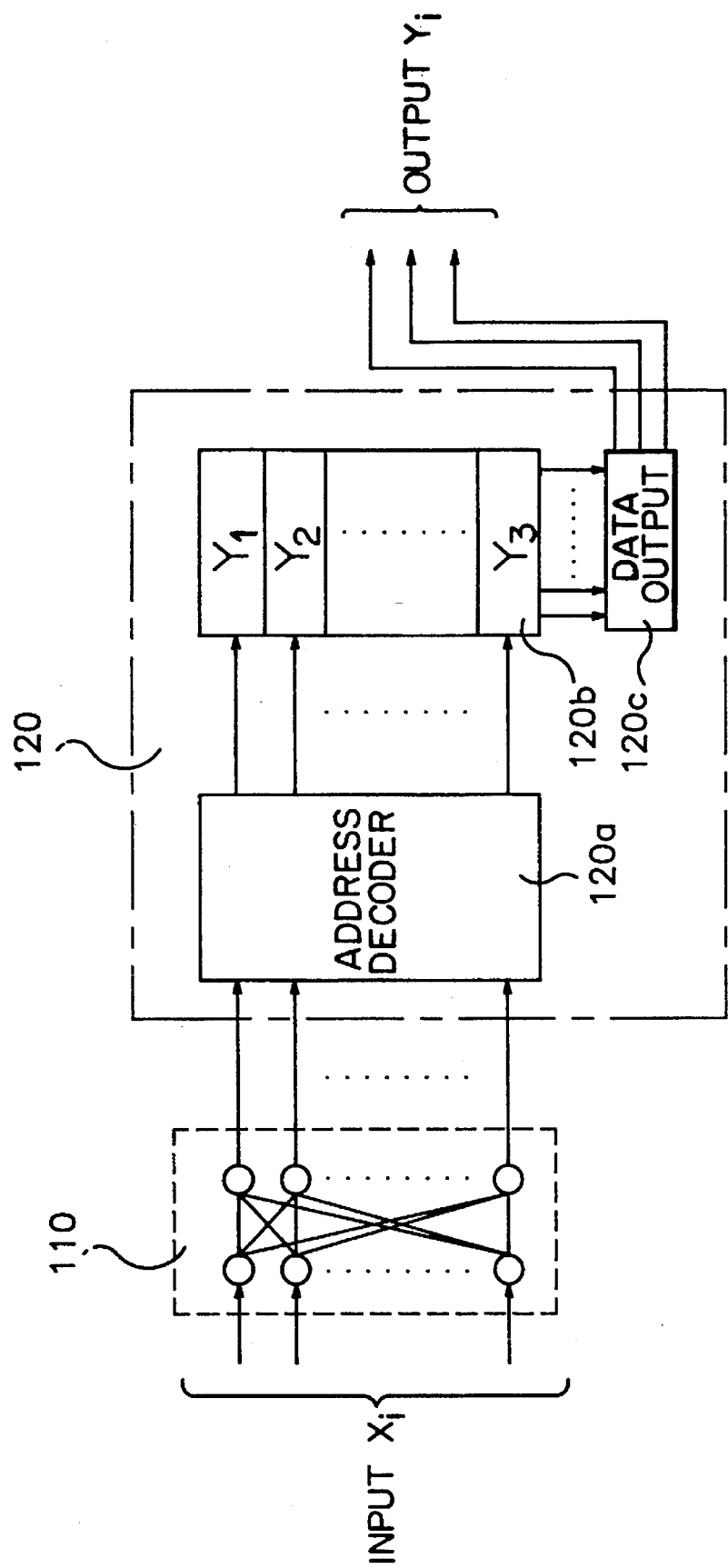
FIG. 13 is a conceptual block diagram of a HyLCAM according to a second embodiment of the present invention.

FIG. 13 is a conceptual block diagram of the neural network according to the second embodiment. As shown in FIG. 13, the neural network comprises a single layer perceptron 110 adapted to realize direct associations $(X_i, Z_i)$ as linearly separable problems with respect to given inputs $X_i$ and intermediate states $Z_i$ derived and manually linearly separable by the user, and a location addressable memory 120 adapted to receive the intermediate states $Z_i$ from the single layer perceptron 110 as addresses and store given output data $Y_i$ as desired output values, correspondingly to the addresses.

The location addressable memory 120 is of the general memory type and comprises an address decoding part 120a, a content part 120b for storing a content corresponding to each address, and a data output part 120c.

In a manner similar to that of the first embodiment, the single layer perceptron 110 can be called as a content addressable memory.

Figure 14:
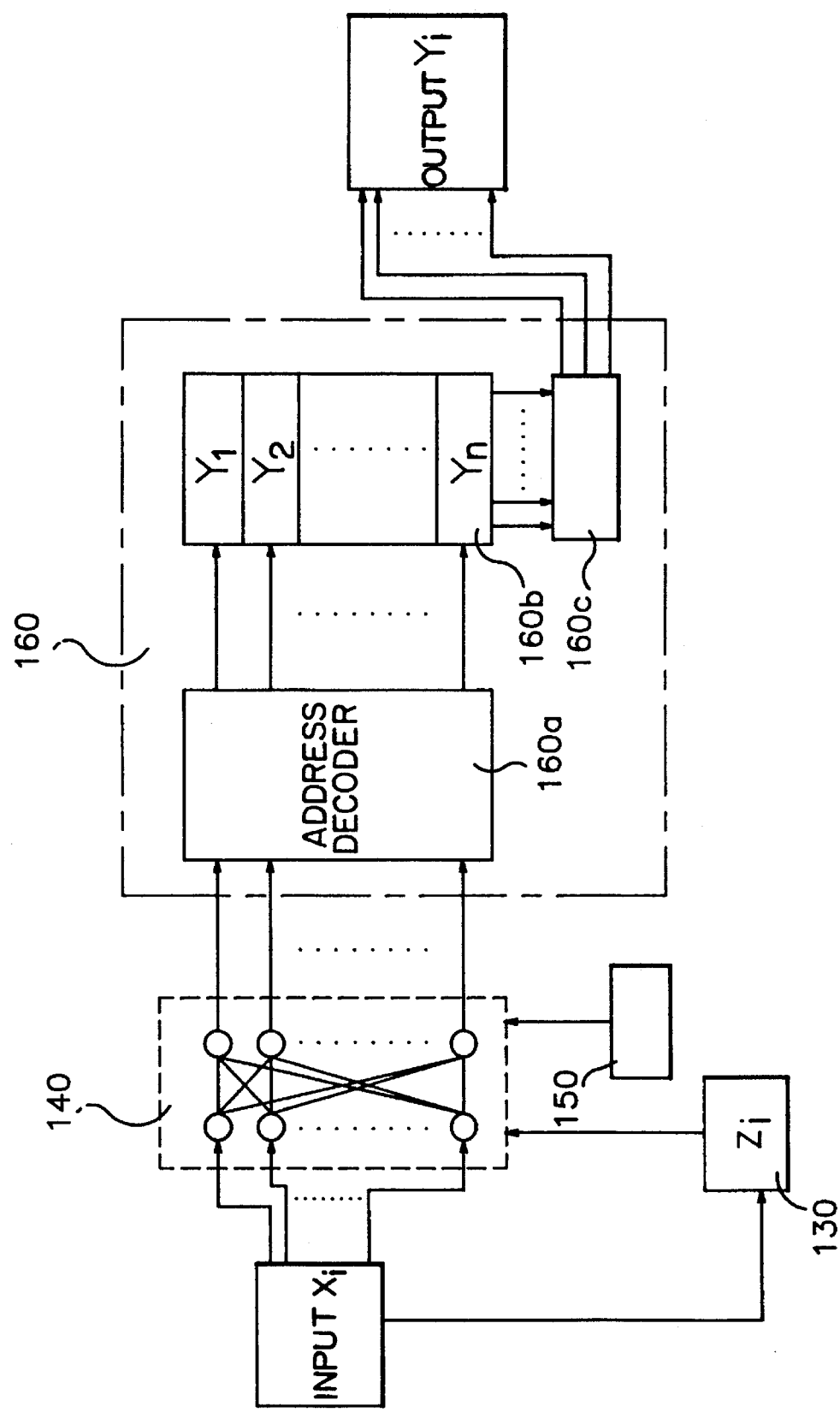
FIG. 14 is a detailed block diagram of the HyLCAM according to the second embodiment.

The neural network of FIG. 13 can be more constructed, as shown in greater detail in FIG. 14.

That is, the neural network shown in FIG. 14 comprises an indirect association code generation device 130 adapted to obtain intermediate states $Z_i$ linearly separable from given input data $X_i$, a single layer perceptron 140 adapted to realize direct association $(X_i, Z_i)$ for the given input data $X_i$ and the intermediate states $Z_i$, a learning device 150 adapted to learn the direct associations $(X_i, Z_i)$ by the least mean square learning process, and a location addressable memory 160 adapted to receive the intermediate states $Z_i$ from the single layer perceptron 140 as addresses and store given output data $Y_i$ as desired output values, correspondingly to the addresses.

Identically to the case of FIG. 13, the location addressable memory 160 is of the general memory type and comprises an address decoding part 160a, a content part 160b for storing the outputs $Y_i$ as contents corresponding to respective addresses, and a data output part 160c.

In accordance with the neural network of FIG. 14, the direct associations $(X_i, Y_i)$ are converted into two kinds of direct associations $(X_i, Z_i)$ and $(Z_i, Y_i)$ corresponding to indirect associations. Only the direct associations $(X_i, Z_i)$ are processed to be linearly separable and then learned in the single layer perceptron 140. On the other hand, the direct associations $(Z_i, Y_i)$ are directly stored in the location addressable memory 160. By virtue of such direct storing in the location addressable memory 160, the direct associations $(Z_i, Y_i)$ are not required to be linearly separable.

Accordingly, the neural network of the second embodiment provides an advantage of a reduced indirect code generation time since there is no requirement of generating indirect association codes corresponding to the intermediate states, for the output side and an advantage of simplifying the construction of neural network since there is no requirement of a single layer perceptron for the direct associations $(Z_i, Y_i)$, as compared with the CLCAM of the first embodiment.

The neural network of FIG. 13 can be called as a hybrid location-content addressable memory (HyLCAM), in that it is constituted by one content addressable memory (namely, the single layer perceptron) and one location addressable memory.

In order to learn m number of externally given direct associations $(X_i, Y_i)$ in the HyLCAM of FIG. 13, it is necessary to use a method for finding systematically the intermediate states $Z_i$ which make direct associations $(X_i, Z_{1i})$ separated from the direct associations $(X_i, Y_i)$ into the linearly separable problems.

The linearly separable problems are called indirect association code generation problems. As one of various methods for solving these problems, the second embodiment of the present invention proposes an autoassociation method and a coding method based on the geometrical arrangements of complement data.

The efficiencies of these methods are determined by the number m of given input data $X_i$, the number s of complement data $X_i^c$ for the input data $X_i$ and the dimension n of the input data $X_i$. If $n > m-s-1$, the autoassociation method is more efficient. If not, the coding method based on the complement data is more economical.

The autoassociation method uses directly the input data $X_i$ as the output from the single layer perceptron 140, namely, the intermediate states $Z_i$. Accordingly, this method has advantages of no requirement to generate any indirect codes and of simplifying the construction of the indirect association code generation device 130 shown in FIG. 14, as compared with the indirect code generation method based on the geometrical arrangements of complement data.

The indirect linear separability based on the geometrical arrangements of complement data has already been proved and will be described hereinafter, in conjunction with the following description of the operating procedure carried out by the HyLCAM.

Figure 15A:
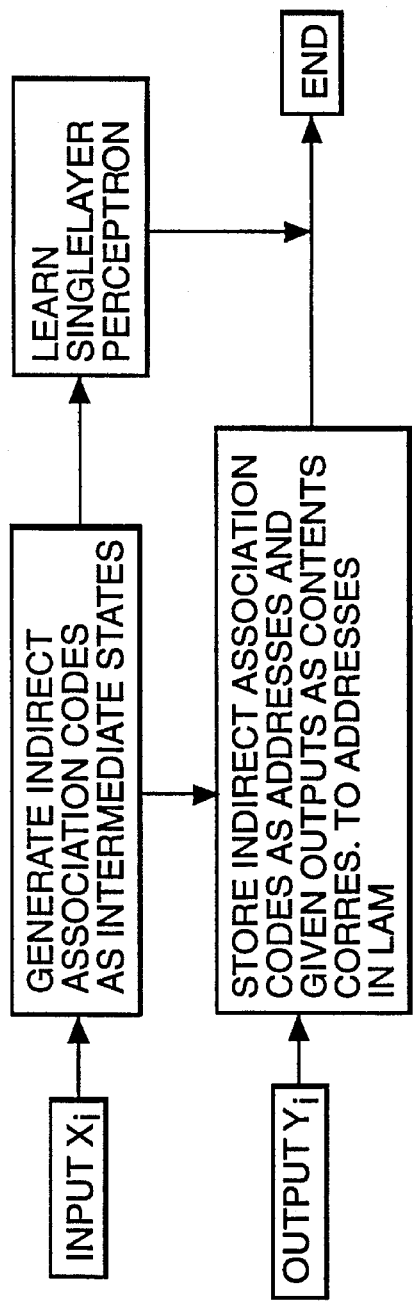
FIG. 15a is a diagram explaining a learning procedure of the HyLCAM according to the second embodiment.
Figure 15B:
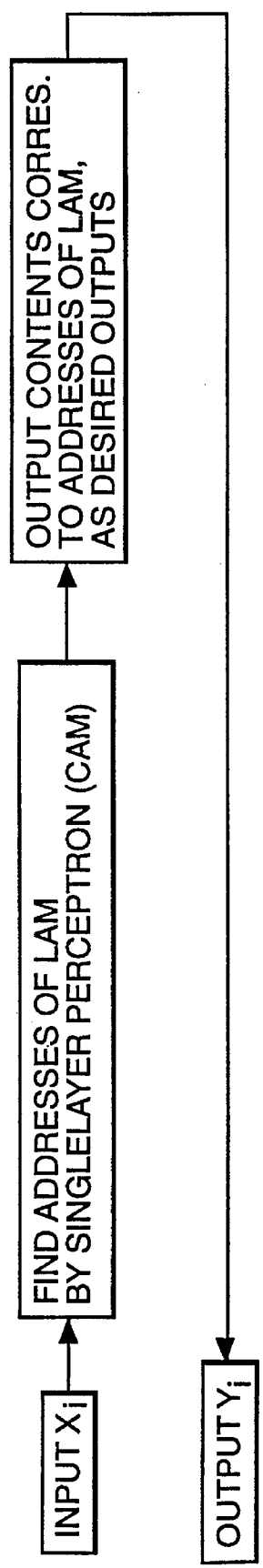
FIG. 15b is a diagram explaining an association procedure of the HyLCAM according to the second embodiment.

The operating procedure of the HyLCAM shown in FIG. 14 includes mainly a learning procedure shown in FIG. 15a and an association procedure shown in FIG. 15b.

As shown in FIG. 15a, the operating procedure comprises a first learning procedure of deriving the intermediate states $Z_i$ for obtaining linearly separable indirect association codes with respect to given input data $X_i$ as single intermediate states $Z_i$ by using the given input data $X_i$ and given output data $Y_i$ through the indirect association code generation device and a second learning procedure of training direct associations $(X_i, Z_i)$ with respect to the given input data $X_i$ and the intermediate states $Z_i$ derived in the first learning procedure by the least mean square learning process in the single layer perceptron, storing the intermediate states $Z_i$ in the address decoding part 160a of the location addressable memory and storing the given output data $Y_i$ in the content part 160b of the location addressable memory 160.

First Learning Procedure

The first learning procedure can be achieved by the two above-mentioned methods, that is, the autoassociation method and the coding method based on the geometrical arrangements of complement data. The procedure will now be described, in conjunction with FIG. 16.

Autoassociation Method

If $n>m-s-1$, the autoassociation method is used as the indirect association code generation method. In accordance with this method, the given input data $X_i$ is directly used as outputs (or intermediate states $Z_i$) of the single layer perceptrons of FIGS. 13 and 14. That is, $Z_i=X_i$.

Such an indirect code generation method is based on the fact that all autoassociations $(X_1,X_1), (X_2,X_2) \ldots (X_m,X_m)$ can be linearly separated. Herein, $X_i$ is a n-dimensional vector. The generated direct associations $(X_i, Z_i)$ can also be linearly separated, in that $Z_i=X_i$. Also, the dimension of vectors indicative of the intermediate states $Z_i$ is the same as that of input vectors. That is, $h=n$.

The autoassociation method is also called an indirect code generation method based on redundant data. It will now be described in more detail, in the order of theorem, proof and corollary.

This method results from the following theorem that describes any redundant data pairs that are linearly separable.

Theorem 1: Redundant data paris $(X_1,X_1), (X_2,X_2) (X_m, X_m)$ are linearly separable where each input data $X_i$ is a n-dimensional binary vector.

Proof: First assume $n=3$ since the proof for the case of this specific n can be easily extended to a general case, i.e., an arbitrary n. Consider the case of $m=2n=8$. The given autoassociations as switching functions can be depicted in a truth table. This is shown in the first and second columns of Table 1.

TABLE 1

(Truth table of autoassociations and their corresponding inequality)

| $X_1$ | $X_2$ | $X_3$ | $f_1$ | $f_2$ | $f_3$ | Inequality Eqs. |
|---|---|---|---|---|---|---|
| 0 | 0 | 0 | 0 | 0 | 0 | $0 < T$ |
| 0 | 0 | 1 | 0 | 0 | 1 | $W_3 < T$ |
| 0 | 1 | 0 | 0 | 1 | 0 | $W_2 < T$ |
| 0 | 1 | 1 | 0 | 1 | 1 | $W_2 + W_3 < T$ |
| 1 | 0 | 0 | 1 | 0 | 0 | $W_1 > T$ |
| 1 | 0 | 1 | 1 | 0 | 1 | $W_1 + W_3 > T$ |
| 1 | 1 | 0 | 1 | 1 | 0 | $W_1 + W_2 > T$ |
| 1 | 1 | 1 | 1 | 1 | 1 | $W_1 + W_2 + W_3 > T$ |

TABLE 2

(Truth table for evaluating the linear separability of $f_2$)

| $X_1$ | $X_2$ | $X_3$ | $f_1$ | Inequality Eqs. |
|---|---|---|---|---|
| 0 | 0 | 0 | 0 | $0 < T$ |
| 0 | 0 | 1 | 0 | $W_1 < T$ |
| 0 | 1 | 0 | 0 | $W_3 < T$ |
| 0 | 1 | 1 | 0 | $W_2 + W_3 < T$ |
| 1 | 0 | 0 | 1 | $W_2 > T$ |
| 1 | 0 | 1 | 1 | $W_1 + W_2 > T$ |
| 1 | 1 | 0 | 1 | $W_2 + W_3 > T$ |
| 1 | 1 | 1 | 1 | $W_1 + W_2 + W_3 > T$ |

Now consider the linear separability of the switching function $f_1$. Based on the theory of switching functions, 8 inequality equations are constructed and written in the third column of Table 1. There is no contradiction in the top four rows, which implies that there exist weights $W_i$ that satisfy the inequality equations. It should be pointed out that, since the bottom four rows can be obtained by adding the gain term $W_i$ and reversing the inequality signs to the top four rows, there is no contradiction. Since the top and the bottom equations have common patterns, they can be combined and written as the following equations (10) to (13):

$$T' \leq 0 < T \tag{10}$$

$$T' \leq W_3 < T \tag{11}$$

$$T' \leq W_2 < T \tag{12}$$

$$T' \leq W_2 + W_3 < T \tag{13}$$

wherein, $T'=T-W_i$.

It is guaranteed to find $W_i$, T and T' which satisfy the equations (10) to (13). Thus, it can be concluded that the switching function $f_1$ is linearly separable. The linear separability of $f_2$ is proved by rewriting the truth table as shown in Table 2. The corresponding inequality equations consist of the same pattern observed in equations generated for $f_1$ even though the subscripts have been changed. Based on the same reasoning applied for showing the linear separability of $f_1$, it can be also concluded that the switching function $f_2$ is linearly separable. The linear separability of $f_3$ is checked by using the same procedure.

Finally, consider the case of $m<2^n$. This case implies that there are missing terms which can be viewed as "don't care terms". Since a subset of noncontradictory equations are always noncontradictory, the "don't care terms" do not affect the linear separability of a switching function. The proof is easily extended to an arbitrary n by considering that there exist the common patterns in the truth table which always produces noncontradictory inequality equations.

Corollary 1: The single layer perceptrons can always represent and learn any autoassociations $(X_1,X_1), (X_2,X_2)$ .

... $(X_m, X_m)$ where each input data $X_i$ is a n-dimensional binary vector.

Proof: From Theorem 1 and the perceptron convergence theorem by Rosenblatt (F. Rosenblatt, Principles of Neurodynamics, New York, Spartan Books, 1959), the proof is completed.

Theorem 1 and Corollary 1 imply that the use of autoassociations can provide a simple solution to the indirect code generation problem. In this case, the dimension of intermediate states is the same as that of input states (h=n).

Indirect Code Generation Method Based on Complement Data

If $n \leq m-s-1$, indirect association codes linearly separable with respect to the input data $X_i$ are generated by using the code generation method based on complement data, in place of the autoassociation method. The indirect code generation method is similar to the method for generating indirect codes as the first intermediate states $z_i$ according to the first embodiment.

Figure 16:
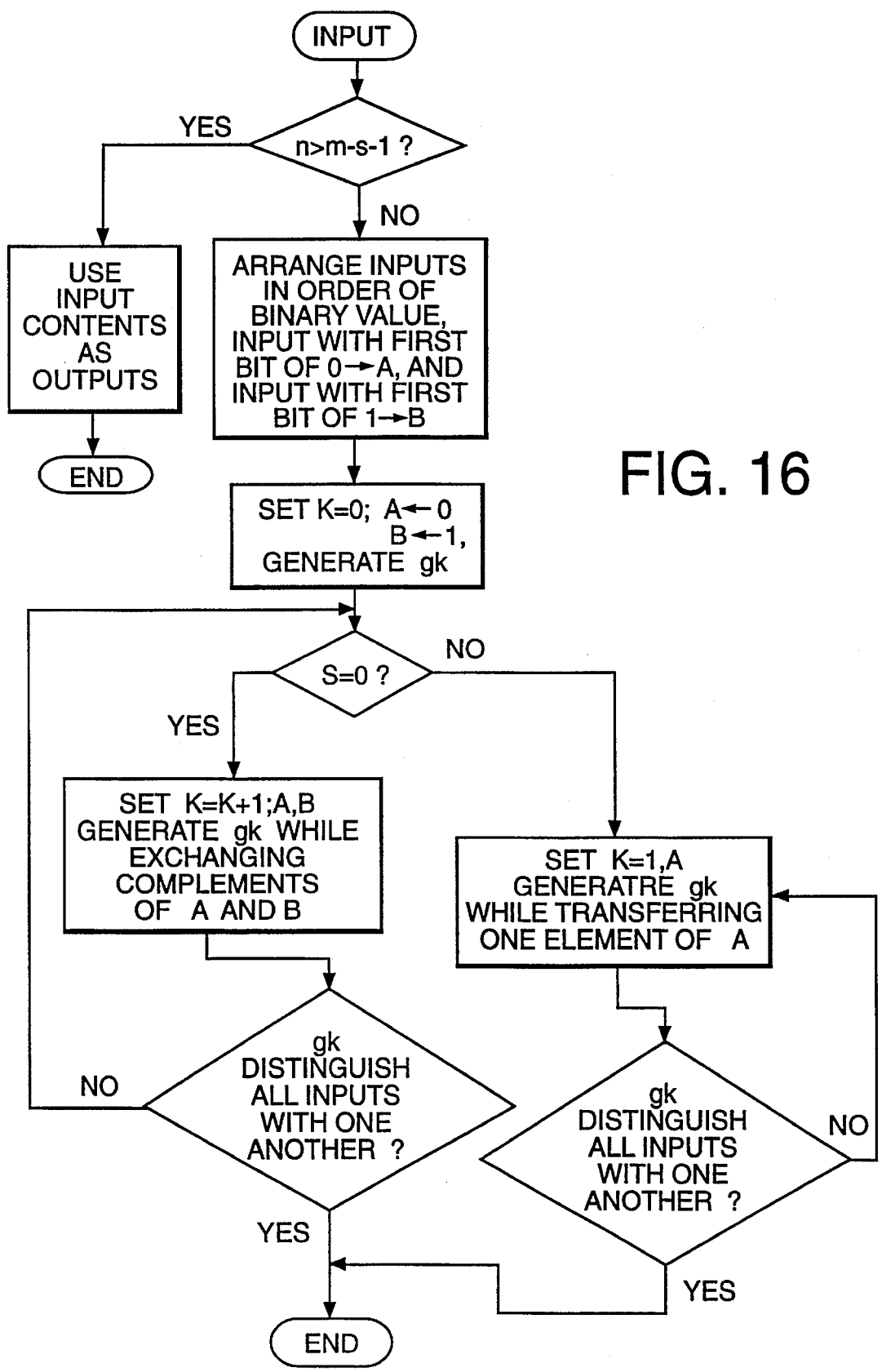
FIG. 16 is a flow chart illustrating a procedure of generating indirect association codes as intermediate states $Z_i$ linearly separable with respect to given input data $X_i$, in accordance with the second embodiment.

To facilitate an understanding of this method, it will be described step by step, in conjunction with FIG. 16.

i) Arrange given binary input data $X_i$ in order of dimension and divide them into two groups which have leftmost bits of 0 and 1, respectively. One set, denoted by A, consists of the input data $X_i$ whose first bits are 0. The other set, denoted by B, consists of the input data $X_i$ whose first bits are 1. Where all the input data $X_i$ have first bits of 0, the set B is an empty set. On the contrary, where all the input data $X_i$ have first bits of 1, the set A is an empty set.

ii) Set k=0. Generate a vector $g_k$ by assigning 0 to all elements of the set A and 1 to all elements of the set B.

iii) Find all elements of the set A whose complements are elements of the set B. Suppose that the number of found data is S. If S=0, then go to a step (vi).

iv) Set k=k+1. Suppose that $X_1$ of the set A are such elements that $X_1^c$ are elements of the set B. Transfer $X_1$ and $X_1^c$, which is the complement of $X_1$, to the sets B and A, respectively. Then, denote the resultant sets by $A_k$ and $B_k$. Construct $g_k$ by assigning 0 to all elements of the set $A_k$ and 1 to all elements of the set $B_k$.

v) Consider a matrix G whose row vectors are $\{g_1, g_2 \ldots g_k\}$. If column vectors of the matrix G are the intermediate states $Z_i$ to be derived and these intermediate states $Z_i$ enable the input vectors to be distinguished from one another, then go to a step (vii). Otherwise, repeat (iv) until k=s.

vi) Set k=1. Transfer elements of the set A whose complements are not elements of the set B, to the set B. Then, denote the resultant sets by $A_{s+k}$ and $B_{s+k}$. Generate binary vectors $g_{s+k}$ by assigning 0 to all elements of the set $A_{s+k}$ and 1 to all elements of the set $B_{s+k}$.

vii) Consider a matrix whose row vectors are the binary vectors $g_{s+k}$ and determine column vectors of the matrix as the intermediate states $Z_i$. Repeat the step (vi) until the intermediate states $Z_i$ enable the input vectors to be distinguished from one another.

viii) Stop the code generation.

Second Learning Procedure

The second learning procedure comprises a step of learning direct associations $(X_i, Z_i)$ of two kinds of direct associations $(X_i, Z_i)$ and $(Z_i, Y_i)$ derived by using the intermediate states $Z_i$ derived in the first learning procedure, by the least mean square learning process in the single layer perceptron of FIG. 14 and a step of storing the remaining direct associations $(Z_i, Y_i)$ as addresses and contents in the location addressable memory 160.

Association Procedure

As shown in FIG. 15b, the association procedure of the HyLCAM comprises two procedures as follows:

i) Upon receiving the given input data $X_i$, the single layer perceptron trained by the above-mentioned learning procedure outputs the intermediate states $Z_i$ as addresses of the location addressable memory.

ii) The location addressable memory outputs the contents corresponding to respective addresses outputted from the single perceptron, that is, the given output data $Y_i$.

As is apparent from the above description, the second embodiment of the present invention proposes a new neural network, by utilizing the concept of indirect association. In accordance with the present invention, it is possible to increase the number of single layer perceptrons used in the HyLCAM by using the indirect association code combination method in order to realize the indirect association.

For example, a neural network for solving a particular kind of problem may be constructed by connecting several HyLCAMs of FIGS. 13 and 14, in series. Alternatively, another network for solving another particular kind of problem may be constructed by connecting several HyLCAMs, in parallel.

Also, where the given input data and output data are real-valued vectors, another network may be constructed, which includes a Q-level quantizer or an analog/digital converter, together with the HyLCAM.

The HyLCAM of the second embodiment provides the effect of simplifying the overall neural network structure since there is no requirement for an output-side single layer perceptron, and the effect of shortening the learning time since indirect codes (namely, intermediate states) are generated according to the autoassociation method, as compared with the CLCAM of the first embodiment. Of course, the HyLCAM also has all the above-mentioned advantages of the first embodiment, as compared with the conventional multilayer perceptrons.

To demonstrate the performance of the HyLCAM proposed by the second embodiment, simple n-input and single output XOR problems were considered. This problem is especially attractive, since the PDP Group (D. E. Rumelhart, G. E. Hinton, and R. J. Williams, "Learning Internal Representations by Error Propagation" in Parallel Distributed Processing. Cambridge, MA:MIT Press, 1988, pp. 318–362) have found that multilayer perceptrons incorporated with the back propagation algorithm sometimes get stuck into local error minima with this problem.

First, the learning of the HyLCAM was considered. Since n<m−s−1, for any n, the autoassociation method was used to find proper intermediate states. Table 3 shows the intermediate states for the 3-input XOR problem. Subsequently, the obtained direct associations $(X_i, Z_i)$ and $(Z_i, Y_i)$ were stored in the single layer perceptron and location addressable memory of the HyLCAM, respectively.

TABLE 3

(The 3-input XOR and its formed intermediate states)

| $X_1$ | $X_2$ | $X_3$ | $f_1$ | $Z_1$ | $Z_2$ | $Z_3$ |
|---|---|---|---|---|---|---|
| 0 | 0 | 0 | 0 | 0 | 0 | 0 |
| 0 | 0 | 1 | 1 | 0 | 0 | 1 |
| 0 | 1 | 0 | 1 | 0 | 1 | 0 |
| 0 | 1 | 1 | 0 | 0 | 1 | 1 |
| 1 | 0 | 0 | 1 | 1 | 0 | 0 |
| 1 | 0 | 1 | 0 | 1 | 0 | 1 |
| 1 | 1 | 0 | 0 | 1 | 1 | 0 |
| 1 | 1 | 1 | 1 | 1 | 1 | 1 |

In order to compare the learning speed, a comparative test was also carried out, which solved the same problems by using the multilayer perceptrons trained by the back propagation algorithm. To make the comparison fair, the number of hidden layers was the same as the dimension of $Z_i$.

Figure 17:
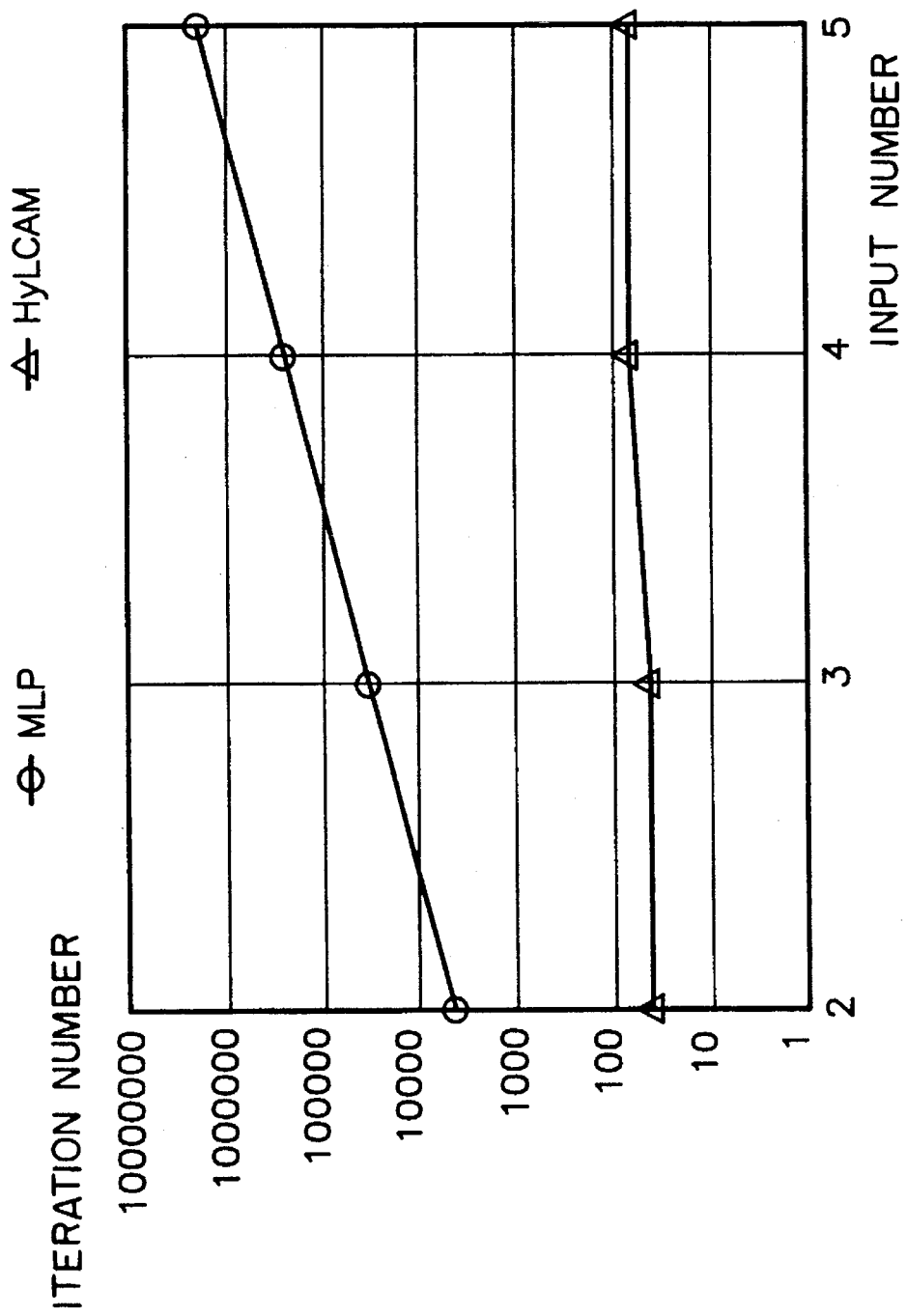
FIG. 17 is a graph illustrating a comparison between learning speeds of the multilayer perceptron and HyLCAM.

FIG. 17 shows a variation in the number of times to train the perceptron for the range of n (the number of input data) from two to five. Referring to FIG. 17, it can be found that the time to train the multilayer perceptron increases, exponentially to an increase of the number of input data $X_i$, whereas the HyLCAM of the present invention exhibits an approximately linear variation. That is, the HyLCAM does not involve the scaling-up problem pointed out by Minskey and Papert.

It was also confirmed that the multilayer perceptron became stuck in error minima 4 times out of 24 trials, while the HyLCAM performed without getting stuck in error minima. Thus, FIG. 17 indicates that the HyLCAM provides a guaranteed solution with a fast learning speed.

Although the preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A neural network comprising:
    an input-side single layer perceptron for generating direct associations ($X_i$, $Z_{1i}$) as linearly separable problems with respect to given inputs ($X_i$) and first intermediate states ($Z_{1i}$) derived by a user;
    an output-side single layer perceptron for generating direct associations ($Z_i$, $Y_i$) as linearly separable problems with respect to given outputs ($Y_i$) and second intermediate states ($Z_{2i}$) derived by the user; and
    a location addressable memory for connecting said first intermediate states ($Z_{1i}$) with said second intermediate states ($Z_{2i}$).

2. A neural network in accordance with claim 1, wherein each of said input-side single layer perceptron and said output-side single layer perceptron is a content addressable memory.

3. A plurality of neural networks each of which is structured in accordance with the neural network of claim 1, wherein said plurality of neural networks are connected in series to solve a first type of problem.

4. A plurality of neural networks each of which is structured in accordance with the neural network of claim 1, wherein said plurality of neural networks are connected in parallel to solve a second type of problem.

5. A neural network or plurality of neural networks in accordance with any one of claims 1 to 4, wherein when said inputs ($X_i$) and outputs ($Y_i$) are real-valued vectors, said neural network further comprises an analog/digital converter for processing said real-valued vectors.

6. A neural network or plurality of neural networks in accordance with any one of claims 1 to 4, wherein when said inputs ($X_i$) and outputs ($Y_i$) are real-valued vectors, said neural network further comprises a Q-level quantizer for processing said real-valued vectors.

7. A neural network comprising:
    indirect association code generation means for obtaining first intermediate states ($Z_{1i}$) and second intermediate states ($Z_{2i}$) linearly separable from given input data ($X_i$) and given output data ($Y_i$);
    an input-side single layer perceptron for generating direct associations ($X_i$, $Z_{1i}$) as linearly separable problems with respect to said given input data ($X_i$) and said first intermediate states ($Z_{1i}$);
    an output-side single layer perceptron for generating direct associations ($Z_{2i}$,$Y_i$) as linearly separable problems with respect to the given output data ($Y_i$) and said second intermediate states ($Z_{2i}$);
    learning means for learning said direct associations ($X_i$), ($Z_{1i}$) and ($Z_{2i}$, $Y_i$) by a least mean square learning process; and
    a location addressable memory for connecting the first intermediate states ($Z_{1i}$) with respect to said input-side single layer perceptron with the second intermediate states ($Z_{2i}$) with respect to said output-side single layer perceptron.

8. A neural network in accordance with claim 7, wherein each of said input-side and said output-side single layer perceptrons is a content addressable memory.

9. A plurality of neural networks each of which is structured in accordance with the neural network of claim 7 wherein said plurality of neural networks are connected in series to solve a first type of problem.

10. A plurality of neural networks each of which is structured in accordance with the neural network of claim 7 wherein said plurality of neural networks are connected in parallel for solving a second type of problem.

11. A neural network or plurality of neural networks in accordance with any one of claims 7 to 10, wherein when said input data ($X_i$) and said output data ($Y_i$) are real-valued vectors, and said neural network further comprises an analog/digital converter for processing said real-valued vectors.

12. A neural network or plurality of neural networks in accordance with any one of claims 7 to 10, wherein when said input data ($X_i$) and said output data ($Y_i$) are real-valued vectors, and said neural network further comprises a Q-level quantizer for processing said real-valued vectors.

13. A neural network comprising:
    a single layer perceptron for generating direct associations ($X_i$,$Z_i$) as linearly separable problems with respect to given input data ($X_i$) and intermediate states ($Z_i$) manually derived by a user; and
    a location addressable memory for receiving said intermediate states ($Z_i$) from said single layer perceptron as addresses and storing given output data ($Y_i$) as desired output values, correspondingly to said addresses.

14. A neural network in accordance with claim 13, wherein said single layer perceptron is a content addressable memory.

15. A plurality of neural networks each of which is structured in accordance with the neural network of claim 13, wherein said plurality of neural networks are connected in series to solve a first type of problem.

16. A plurality of neural networks each of which is structured in accordance with the neural network of claim 13, wherein said plurality of neural networks are connected in parallel to solve a second type of problem.

17. A neural network or a plurality of neural networks in accordance with any one of claims 13 to 16 wherein, when said input data ($X_i$) and said output data ($Y_i$) are real-valued vectors, said neural network further comprises an analog/digital converter for processing said real-valued vectors.

18. A neural network or a plurality of neural networks in accordance with any one of claims 13 to 16, wherein, when said input data ($X_i$) and said output data ($Y_i$) are real-valued vectors, said neural network further comprises a Q-level quantizer for processing said real-valued vectors.

19. A neural network comprising:
  indirect association code generation means for obtaining intermediate states ($Z_i$) linearly separable from given input data ($X_i$) and given output data ($Y_i$);
  a single layer perceptron for providing direct associations ($X_i$, $Z_i$) for said given input data ($X_i$) and said intermediate states ($Z_i$);
  learning means for learning said direct associations ($X_i$, $Z_i$) by a least mean square learning process; and
  a location addressable memory for storing the intermediate states ($Z_i$) from said single layer perceptron as addresses and for storing said given output data ($Y_i$) as desired output values, correspondingly to said addresses.

20. A neural network in accordance with claim 19, wherein said single layer perceptron is a content addressable memory.

21. A plurality of neural networks each of which is structured in accordance with the neural network of claim 19, wherein said plurality of neural networks are connected in series to solve a first type of problem.

22. A plurality of neural networks each of which is structured in accordance with the neural network of claim 19, wherein said plurality of neural networks are connected in parallel to solve a second type of problem.

23. A neural network or plurality of neural networks in accordance with any one of claims 19 to 22, wherein when said input data ($X_i$ and said output data ($Y_i$) are real-valued vectors, and the neural network further comprises an analog/digital converter for processing said real-valued vectors.

24. A neural network or plurality of neural networks in accordance with any one of claims 19 to 22 wherein, when said input data ($X_i$) and said output data ($Y_i$) are real-valued vectors, and said neural network further comprises a Q-level quantizer for processing said real-valued vectors.

* * * * *

UNITED STATES PATENT AND TRADEMARK OFFICE
CERTIFICATE OF CORRECTION

PATENT NO. : 5,493,632
DATED : February 20, 1996
INVENTOR(S) : Seung Kwon AHN et al It is certified that error appears in the above-indentified patent and that said Letters Patent is hereby corrected as shown below:

Claim 23, Column 20, Line 16, change "$(X_i$" to $--(X_i)--$.

Signed and Sealed this

Nineteenth Day of November, 1996

Attest:

BRUCE LEHMAN

*Attesting Officer*  *Commissioner of Patents and Trademarks*